(12) United States Patent
Levin

(10) Patent No.: US 7,552,673 B2
(45) Date of Patent: Jun. 30, 2009

(54) PORTABLE BEVERAGE PREPARATION DEVICE AND SYSTEM

(75) Inventor: Shalom Levin, Atlit (IL)

(73) Assignee: Concept & Design Ltd., Atlit (IL)

( * ) Notice: Subject to any disclaimer, the term of this patent is extended or adjusted under 35 U.S.C. 154(b) by 608 days.

(21) Appl. No.: 10/522,982

(22) PCT Filed: Aug. 7, 2003

(86) PCT No.: PCT/IL03/00658
§ 371 (c)(1),
(2), (4) Date: Jul. 11, 2005

(87) PCT Pub. No.: WO2004/014739
PCT Pub. Date: Feb. 19, 2004

(65) Prior Publication Data
US 2005/0284302 A1    Dec. 29, 2005

(51) Int. Cl.
A47J 31/00    (2006.01)
(52) U.S. Cl. .......................... 99/323.3; 99/288; 99/295; 99/302 R; 426/433
(58) Field of Classification Search ............... 99/323.3, 99/323, 295, 300, 302 R, 307, 288; 426/433
See application file for complete search history.

(56) References Cited
U.S. PATENT DOCUMENTS 2,715,868 A *   8/1955  Brown ...................... 99/302 R
4,167,899 A *   9/1979  McCormick ............... 99/302 R
4,452,130 A *   6/1984  Klein .......................... 99/307
4,738,378 A *   4/1988  Oakley et al. ................. 222/82
5,300,308 A *   4/1994  Louridas ..................... 426/112
5,771,788 A *   6/1998  Lee et al. ...................... 99/468
5,772,017 A     6/1998  Kang
6,172,340 B1 * 1/2001  Chang ........................ 219/438
6,372,270 B1    4/2002  Denny
6,443,050 B2 *  9/2002  Timm ........................... 99/299
6,517,878 B2    2/2003  Heczko
6,619,188 B1 *  9/2003  Meador ........................ 99/295
6,622,615 B2 *  9/2003  Heczko ..................... 99/323.3
6,766,106 B2 *  7/2004  Roberson .................... 392/442

* cited by examiner

Primary Examiner—Reginald L Alexander
(74) Attorney, Agent, or Firm—Edward Langer, Adv.; Shibolet & Co.

(57) ABSTRACT

A portable beverage preparation device and system for making brews, mixes, and potions on demand by selectively introducing and mixing predetermined quantities of at least one stored, edible, beverage preparation confined in at least one sealed chamber into a portable beverage container containing a predetermined volume of a potable base liquid and having a dispenser means for introducing the at least one beverage preparation into the potable base liquid; wherein the drink container and the at least one sealed chamber are in close physical proximity to each other and separated by at least one thin membrane which, when inwardly perforated by the dispenser means, introduces the at least one beverage preparation into the base liquid. The system of the invention further provides a brewing element and a portable heating unit, the heater element of which fits into the beverage container for heating the liquid.

33 Claims, 26 Drawing Sheets

PORTABLE BEVERAGE PREPARATION DEVICE AND SYSTEM

FIELD OF THE INVENTION

The present invention is related to the field of beverage preparation devices and systems, and in particular, to a portable beverage preparation device and system for making brews, mixes, and potions on demand by selectively introducing and mixing predetermined quantities of stored, edible, beverage preparations into a portable beverage container containing a predetermined volume of a potable base liquid.

BACKGROUND OF THE INVENTION

People enjoy drinking cold and hot beverages at all times, and especially while on the go. Coffee, tea, and other hot drinks of all types are very popular all year around. Children and babies enjoy cold or hot milk, often with a chocolate or other flavor added. In the morning, hot drinks such as coffee, are preferred by many adults.

In order to have this coffee for the morning commute, a person either has to be up early to prepare the coffee in his home, or prepare it the night before and keep it hot in a thermos type container. As society becomes increasingly mobile, the morning routine is disturbed and a person either goes without a morning drink or must wait until he or she is at school or work to prepare a favorite beverage for him or herself, if there is time. Hot instant teas and soups require heating facilities, whether at the office or at home and cannot easily be prepared while in a car. Thermos bottles filled with coffee prepared from the night before may supply the needs of some people for a drink, but such coffee is usually not very hot and not as tasty as when freshly brewed.

As the sophistication for coffee increases, people now enjoy more sophisticated coffee drinks as their morning coffee, such as espressos, and other espresso-based drinks, such as lattes, cappuccinos, and the like. Espresso must be consumed while fresh, and at high temperatures, to preserve the quality and taste. Accordingly, preparation of an espresso or espresso-based drink before the morning commute or other automobile trip, typically requires additional preparation time, that people may not have if they are pressed for time. Additionally, in many areas, there may not be any outlets for purchasing an espresso or espresso-based drink to be enjoyed at rest-stops along the way. Finally, even if an espresso or espresso-based drink can be purchased on the road, it may be of low quality, stale, and in a disposable cup that cannot preserve the high heat required to keep the drink hot and tasty.

Although many cold drinks are on the market, they generally have the disadvantage of requiring refrigeration to maintain their cool temperature. Until use, many drinks must be kept in a refrigerator. Furthermore, if the drinks are already mixed, their shelf-life is limited. Many cold drinks and mixes are packaged in containers that do not allow people on the go to add ingredients, such as sweeteners or flavors, to suit the individual taste of the consumer. Disposal of commonly used drink containers, such as bottles, metal cans, and even plastic, is often complicated when traveling by the need to find a recycling bin or a place to claim a refund on a deposit. Usually, discouraged consumers will simply throw away the container, hopefully in a waste receptacle, but not always. If some residue of the drink remains in the container, it can cause unnecessary and unsightly environmental and sanitation problems by spilling-over and attracting insects and rodents.

Thus, it would be desirable to provide a broad choice of prepared beverages, both cold and hot, which are freshly made, at reasonable cost, and with minimum effort, according to taste and preference of the consumer.

SUMMARY OF THE INVENTION

Accordingly, it is a principal object of the present invention to overcome problems associated with beverage preparation and provide a portable beverage preparation device and system for preparing both cold mixed drinks and hot brewed beverages.

In accordance with a preferred embodiment of the present invention, there is provided a portable beverage preparation device comprising:
- a drink container containing a predetermined volume of a potable base liquid;
- at least one beverage preparation of a predetermined quantity;
- at least one sealed compartment for confining said beverage preparation; and
- a dispenser means for introducing said at least one beverage preparation into said base liquid within said drink container;

wherein said drink container and said at least one sealed compartment are in close physical proximity to each other and separated by at least one thin membrane which, when inwardly perforated by said dispenser means, introduces said at least one beverage preparation into said base liquid.

In the preferred embodiment, the portable beverage preparation device and system can prepare both cold mixed drinks and hot brewed beverages, and prepare potions and remedies involving addition of edible ingredients to a potable, base liquid, such as treated water. These additives, in the form of ready-to-mix ingredients, such as powders and concentrates, are provided in one or more separate chambers or chambers in communication with a portable beverage preparation device comprising a container, such as a cup, a baby bottle, a medicine bottle, and the like. The chambers storing the ready-to-mix ingredients are disposed in physical proximity to the container and, in accordance with various embodiments of the invention, are external or internal to the body of the container, such as on a side or bottom. In another embodiment of the invention, the chamber is fabricated as an element of the cover, or cap of the container For example, in one embodiment of the invention, a sealed cup is provided with at least one, over-the-cover, protruding chamber for holding edible ingredients. In another embodiment of the invention, the chamber is embedded in the handle of the container.

Furthermore, the portable beverage preparation device of the invention is conveniently provided with a built-in dispenser means for introducing the beverage preparation into the potable base liquid. There is no need to open a container to mix the ingredients and spills are avoided. In one embodiment of the invention, small openings are provided in the sealed container cover allowing for the insertion of a drinking straw, alternatively, a consumer can choose to sip the drink from a convenient lip-size mouthpiece built into the cover.

The chamber may be any shape or combination of shapes and configurations and the number of such chambers is only limited by the surface space available, but in one preferred embodiment of the invention, the shape is accordion-like. In another embodiment of the invention, it is dome-shaped, or bubble-shaped. Finger pressure on any of the chambers selects the ingredients of that chamber and bursts a foil seal between the inward-facing surface of the selected chamber and the cup, dispensing the ingredients into the potable liquid stored therein. After shaking the cup to mix the ingredients with the liquid, the drink is ready to consume.

The container of the portable beverage preparation device, such as a cup, in a preferred embodiment of the invention, is disposable together with any remaining ingredients stored in the chambers.

The container may be made of any suitable material, as is known to those skilled in the art, but in a preferred embodiment of the invention, the drinking container is made of plastic.

Optionally, in another embodiment of the system of the invention, a portable heater unit is provided with the portable container to heat the beverage for on-demand brewing of a hot beverage, for example, espressos, coffees, teas, and soups. Commonly, these beverages and drinks may be consumed with little waiting time since they are easy to prepare. They can also be taken with to work or school and prepared in a break period. Using the lighter socket in a car for power, the drinks may be prepared hot or to taste. All the necessary ingredients are self-contained and fresh. The beverage drinks may also be prepared while camping, vacationing or traveling far from home. By brewing a beverage in a motor vehicle while at a rest stop, or at home, the consumers have a freshly brewed or mixed drink whenever wanted, with little preparation time and effort.

Alternate embodiments of the invention provide for the mixing of a refreshing, favorite cold drink, such as chocolate milk, iced tea, and the like. In the embodiment of the invention for providing hot brewed beverages, the system operates by heating small quantities of liquid, for example, treated water, in a continuous cycle. These small quantities are typically heated to boiling or thereabout, with small amounts of power. The heated liquid is forced (injected) by pressure into contact with a beverage preparation in a pocket or other holder. Once through the pocket, the now formed beverage flows into a receiving chamber in a cup. This process is repeated for a desired number of cycles to prepare the desired beverage. When all desired beverage has been produced, the system can be deactivated, with the cup separated from the remainder of the system so that the produced beverage can be enjoyed.

For hot brewed beverages, the portable beverage preparation device further comprises a heating unit including a heater element configured for fitting within a cup unit. The heater element includes a chamber for holding liquid (for example, water), at least one heat activated valve for sealing the chamber to confine a predetermined volume of fluid in the sealed chamber, a heater rod extending into the chamber (which may also be used for making a cold drink on the Peltier principle), and a tube in communication with the chamber. The chamber is configured for heating a portion of the liquid to at least boiling to produce pressure in the chamber for pushing liquid through the tube. Upon exiting the tube, the hot water typically floods at least one beverage preparation confined in a small compartment or pocket and the hot liquid is forced out and falls or flows directly into an outer cup for collection and to make the ready-to-drink beverage.

There is also disclosed a portable beverage brewing system of a cup unit and a brewing element. The cup unit includes an inner cup and an outer cup, the inner cup spaced apart from the outer cup so as to define a chamber for holding liquid between these cups. The brewing element is configured for fitting on the inner cup and this brewing element is configured for holding at least one beverage preparation and configured for the passage of a base liquid through it. The cup unit, and in particular the inner cup, includes a potable liquid, prepackaged therein, that can be, for example, treated water.

There is further disclosed a portable beverage brewing system of a cup unit, with separable inner and outer cups, and a brewing element. The brewing element fits on the inner cup, is configured for holding beverage preparations and is also configured for the passage of fluid therethrough, and including an outlet proximate to the periphery of the inner cup. The cup, and in particular the inner cup, includes liquid, prepackaged therein, that can be for example, treated water. The brewing element is provided as either a fixed or replaceable element.

Also disclosed is a method (process) for preparing a beverage. This method includes providing a brewing element containing a beverage preparation therein, continuously heating quantities of approximately 15 milliliters (ml) of liquid to at least boiling, and pressurizing the heated liquid to force it into and out of the brewing element. The continuous heating typically lasts until all of the liquid in the inner cup has been exhausted.

Also disclosed is another method for preparing a beverage drink comprising:
providing a drink container containing a predetermined volume of a potable base liquid;
providing at least one sealed chamber containing a predetermined quantity of at least one beverage preparation;
providing a dispenser means for introducing said at least one beverage preparation into the potable base liquid;

wherein the drink container and the at least one sealed chamber are in close physical proximity to each other and separated by at least one thin membrane which, when inwardly perforated by the dispenser means, introduces the at least one beverage preparation into the potable base liquid;
selecting at least one of the at least one beverage preparation from the at least one sealed chamber;
applying pressure to at least one pressure point to activate the dispenser means;
perforating the at least one thin membrane;
releasing the at least one beverage preparation from the at least one sealed chamber into the potable base liquid; and
mixing the at least one beverage preparation with the potable base liquid.

The method for preparing a portable beverage drink further comprises heating the base liquid; and flushing the at least one additive ingredient from the at least one sealed chamber into the base liquid by one of pressure action and sprinkler means.

A further method for producing a brewed beverage drink comprises: a) providing a brewing element including a beverage preparation therein; b) continuously heating quantities of approximately 15 milliliters (ml) of liquid to at least boiling; c) pressurizing the heated liquid to force it into and out of the brewing element; and repeating steps (b) and (c).

Additional features and advantages of the invention will become apparent from the following drawings and description.

BRIEF DESCRIPTION OF THE DRAWINGS

For a better understanding of the invention with regard to the embodiments thereof, reference is now made to the accompanying drawings, in which like reference numerals or characters indicate corresponding or like elements throughout, and in which:

FIG. 12A is a magnified, cross-sectional view of detail 12A from FIG. 12;

DETAILED DESCRIPTION OF THE PREFERRED EMBODIMENTS

Figure 1:
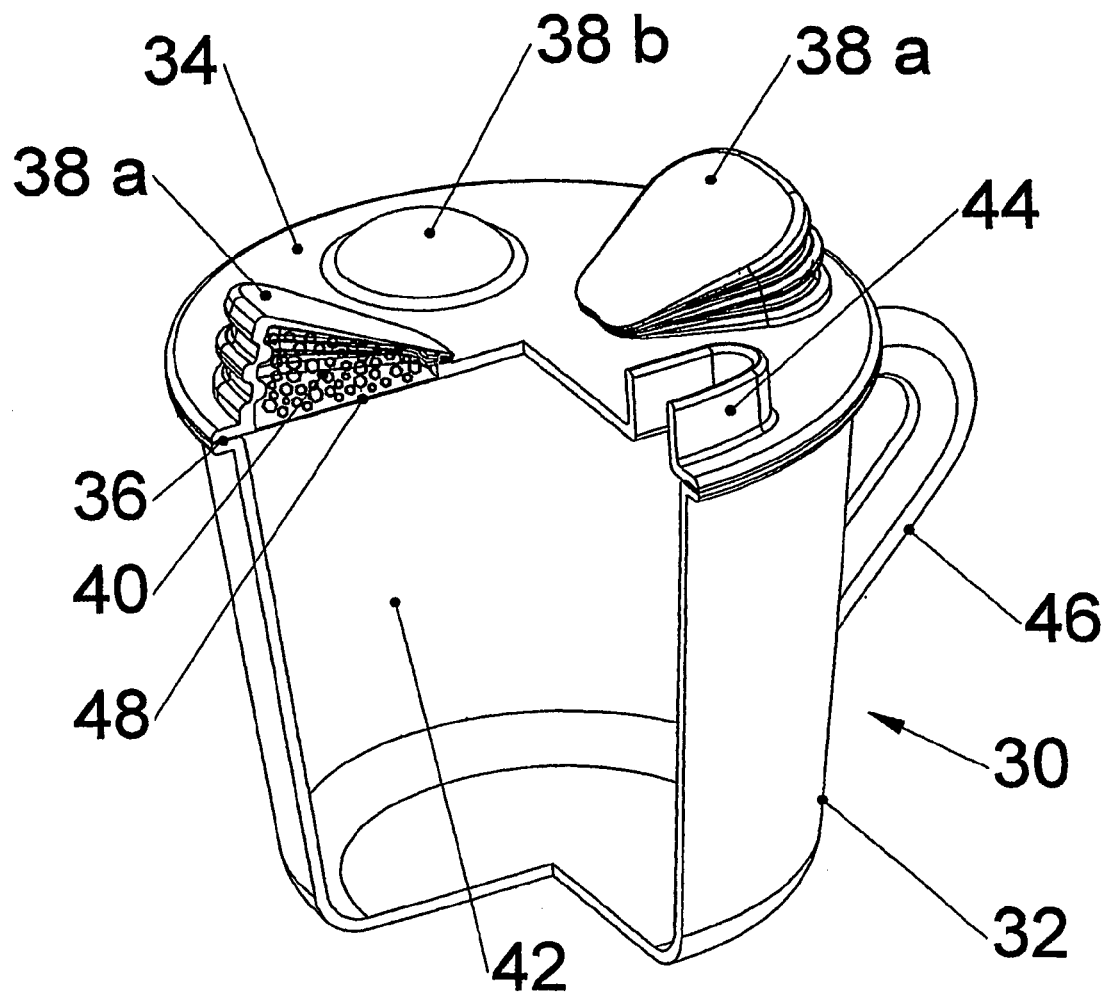
FIG. 1 is a partial cut-away, isometric view of a portable beverage preparation device, comprising a cup and a bonded cover, in a preferred embodiment of the invention.

FIG. 1 is a partial cut-away, isometric view of a portable beverage preparation device, comprising a cup and a bonded cover, in a preferred embodiment of the invention.

A container, such as drinking cup 32, and a tightly fitting cover 34 is sealed with a bond 36 to form a closed portable beverage preparation device. Bond 36 may be a heat seal or a mechanical bond as is known to those skilled in the art.

Cover 34 is provided with at least one sealed chamber 38A/B including a dispersion means (not shown), such as small, sharp punching ribs. At least one additive ingredient 40 is provided in a measured quantity within at least one sealed chamber 38A/B. Ingredients to use are selected by the user, such as, by way of example, any of the ingredients from the groups of edible materials: coffee, tea, cocoa; powders, grounds, and flakes; dried fruits, dried vegetables; fruit juice, vegetable juice; milk and milk-substitute powders; syrups, sweeteners, flavorings; emulsions, solutions, extracts; dried herbs, medicines; liquid concentrates, liquid condensates, and any combination from these groups. Unless otherwise noted, in the various examples of the portable beverage preparation device and system described herein, hot drinks preferably utilize typical coffee or expresso drink ingredients.

The sealed chambers may be of any shape or size which can be accommodated in the available space on the surface of cover 34, but in the preferred embodiment of the invention shown, sealed chambers 38A are accordion-like protuberances. Alternatively, by way of example, sealed chamber 38B is shown as a bubble-like structure. The interior 42 of cup 32 is prefilled with a measured volume of liquid, such as water or milk (not shown). A convenient mouth-piece 44 is provided for drinking the mixed beverage, or a user may insert a straw (not shown) through the opening of mouth-piece 44 and imbibe the beverage in a more informal manner. A handle 46 is an optional feature of cup 32.

Each of the sealed chambers 38A/B is provided with a dispersion means, such as ribs (see FIG. 3), which punch or perforate a thin membrane 48 disposed between each sealed chamber 38A/B and the interior 42 of cup 32. The thin membrane 48 is fabricated of plastic or metallic foil in a preferred embodiment of the invention.

When finger pressure is applied to the top edge of at least one, user-selected, sealed chambers 38a/b, the beverage preparation within the selected chamber is forced out through the holes perforated in the thin membrane 48 by the dispenser means (see rib points 72 in FIG. 3) and fall into the liquid within cup 32. Before drinking the beverage, the user need only shake the portable container to mix the contents more thoroughly. There is no messy waste to clean up from open, spilled cups as in the prior art, since the residue remains sealed inside cup 30.

Figure 2:
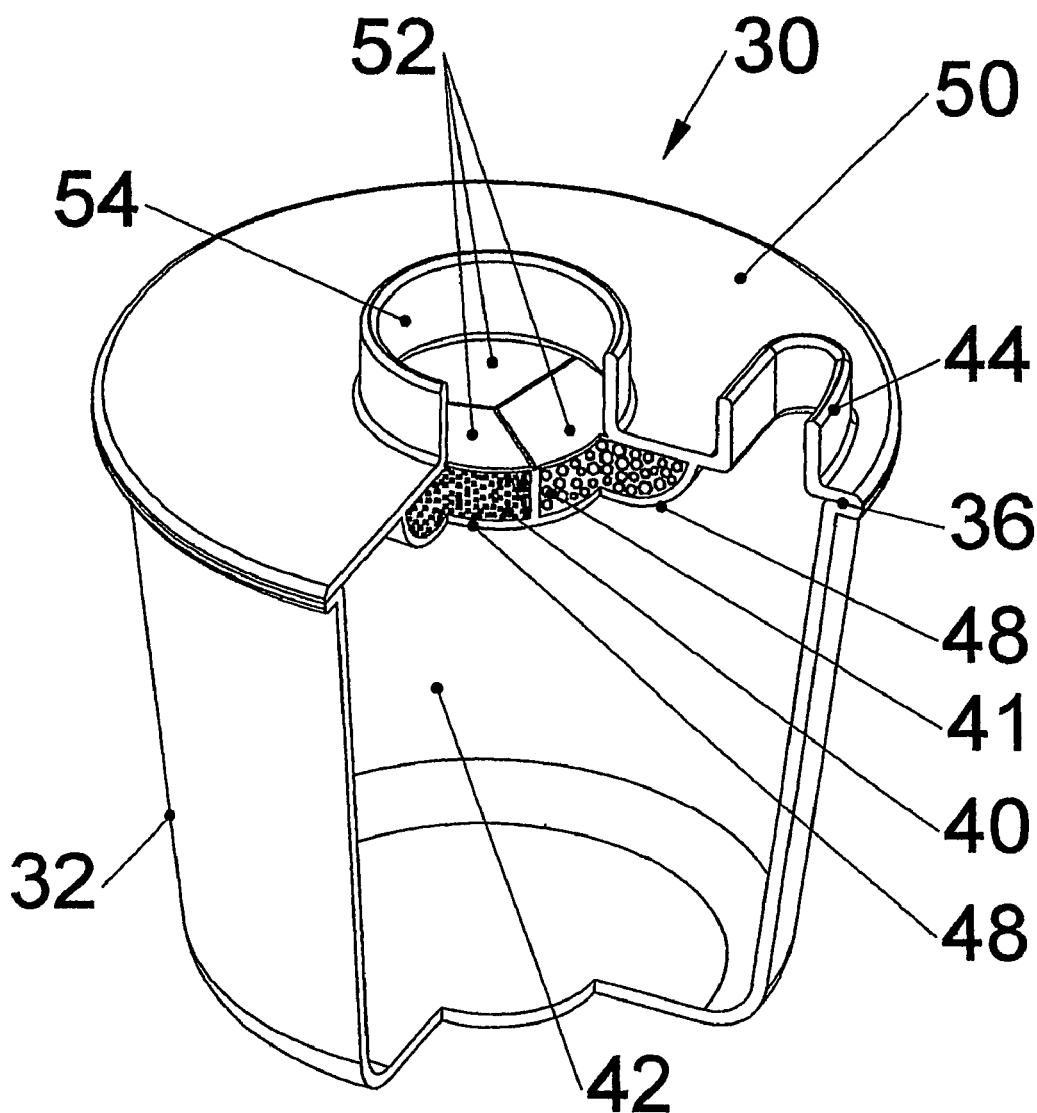
FIG. 2 is a partial cut-away, isometric view of another embodiment of a portable beverage preparation device constructed in accordance with the principles of the invention.

FIG. 2 is a partial cut-away, isometric view of another embodiment of a portable beverage preparation device constructed in accordance with the principles of the invention.

A container, such as drinking cup 32, and a cover 50, which is bonded with a sealing bond 36, form a sealed portable beverage preparation device. Bond 36 may be a heat seal or a mechanical bond as is known to those skilled in the art.

Cover 50 is provided with one or more, under-the-cover, suspended sealed chambers 52. In the example shown in FIG. 2, sealed chambers 52 are divided into three segments, each storing a measured quantity of different beverage preparation for preparing a beverage drink, for example, chocolate powder, milk powder and sugar. Two of the beverage preparation as arbitrarily represented by numbers 40, 41 are visible in the partial cut-away. Not shown are the dispersion means (see FIG. 3), such as small, sharp, punching ribs which are enveloped and surrounded by the beverage preparation. These sealed chambers 52 may be of any shape or size accommodatable in the space available on the undersurface of cover 50, but in the preferred embodiment of the invention shown, sealed chambers 52 are wedge-shaped segments. The interior 42 of cup 32 is prefilled with a predetermined volume of liquid, such as water (not shown). A convenient lip-like mouthpiece 44 is provided for drinking.

Simply shaking the closed cup 32 a few times mixes the beverage, and then it is ready to drink. A small removable cover is provided for reclosing the drinking opening.

Figure 3:
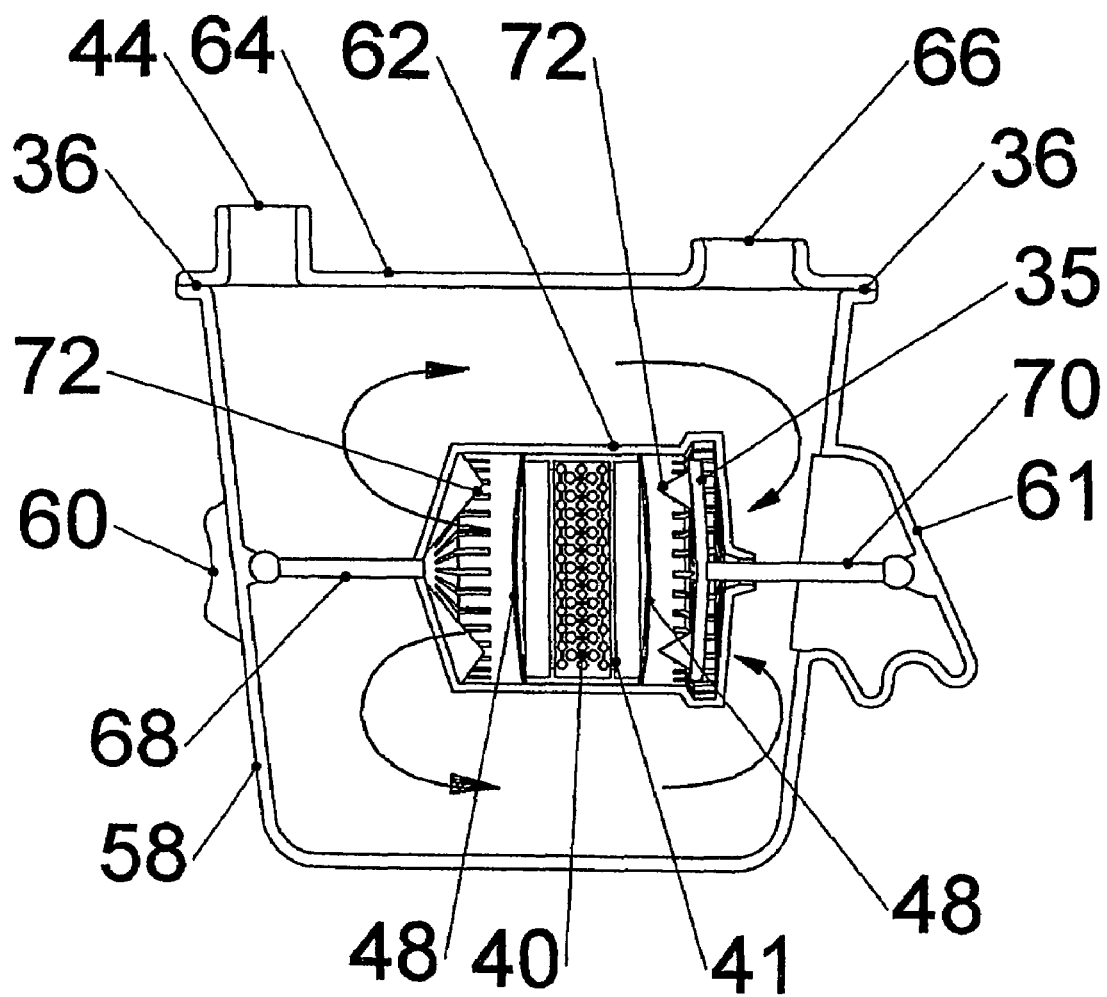
FIG. 3 is yet another embodiment of the invention, illustrating a closed cup with both the sealed chambers for beverage preparation and a pump-type dispersion means disposed within the potable base liquid.

It should be noted that the same cup 32 is adaptable for use with a heater/cooler device by inserting a heating/cooling element 132 (as in FIG. 8), or a simple heater element (not shown) with an adaptor for portable power, into the openings 66 (FIG. 3).

FIG. 3 is yet another embodiment of the invention, illustrating a closed cup with both the sealed chambers for beverage preparation and a pump-type dispenser means disposed within the potable base liquid.

A container, such as cup 58 is provided with press-points 60, 61 on opposing sides of cup 58 for operation of an internal, centrally disposed, pump-type dispersion means 62. Several types of beverage preparation 40, 41 are sealed in between thin, metallic foil membranes 48 which protect them from contact with the base liquid (not shown) provided within cup 58. A cover 64 is sealed by a bond 36 to cup 58. Cover 64 is provided with a mouthpiece lip-type opening 44 for drinking the mixed beverage, and an outer opening 66 for venting. Openings 66 and 44 can also be used for connecting to an inlet and outlet of a heating device or cooler as per FIGS. 8, 9, and 10.

Internal, centrally disposed, piston-type dispersion means 62 is operated by a user by applying finger pressure on press points 60, 61 simultaneously. In one embodiment of the invention, pressure point 61 is shown as an accordion-type protrusion on one side of the cup 58 which collapses with gripping pressure on both pressure points 60, 61. Alternatively, cup flexibility might be sufficient to operate the dispersion means 62 given proper design considerations as is known to those skilled in the art. A fixed bar 68 acts as a break to the inward pressure on flexible bar 70 connected to piston 35, which brings perforating ribs 72 into contact with the thin membranes 48. A first pump on the pressure points 60, 61 acts on the piston 35 and perforates both the inlet and outlet aluminum foils comprising the thin membranes 48 in a preferred embodiment of the invention. The next few pumping actions cause the base liquid to flow as indicated by the arrows, flushing the powder of the beverage preparation 40, 41 to mix and complete the preparation of the beverage drink.

Figure 4:
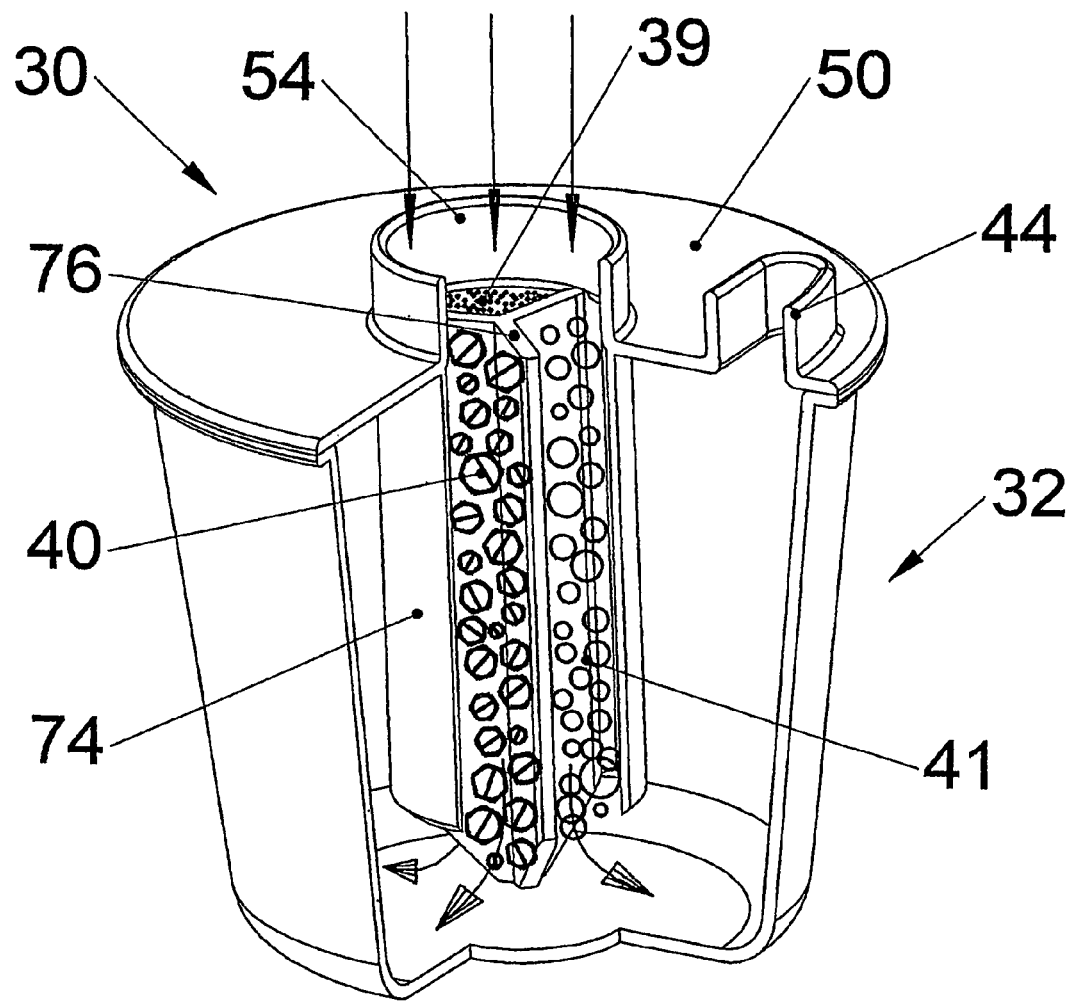
FIG. 4 is a partial cut-away, isometric view of a cup similar to that of FIG. 2, but shown with a core dispersion means with multiple beverage preparation in several vertical sealed containers extending into the cup.

FIG. 4 is a partial cut-away, isometric view of a cup similar to that of FIG. 2, but shown with a core dispersion means with multiple beverage preparation in several vertical sealed containers extending into the cup.

The central cylinder 74 is divided into core segments for storing multiple beverage preparation 39, 40, 41—all of which are provided in measured quantity with cup 32. The dispersion means (not shown) can be designed to extend downward perforating the lower metallic foil membrane (not shown) when pressed, allowing the beverage preparation to disperse, as shown by the lower arrows, into the potable base liquid, preferably water.

Alternatively, hot or cold water is added from an external source through the opening in central core 54 (as shown by vertical arrows) after removing a protective cover (not shown) covering the beverage preparation 39, 40, 41. This allows the cup 32 to be reused when supplied with refill units of beverage preparation selected in accordance with the taste and preference of a user and which is prepackaged in cylindrical form suitable for insertion into the central core 54.

Cover 50 is provided with a mouthpiece lip-type opening 44 which serves as an outlet for drinking the prepared beverage (curved arrow up). One or more small venting slots, not shown in this example, are generally disposed on the cover 50 on the side opposite mouthpiece lip-type opening 44.

Figure 5A:
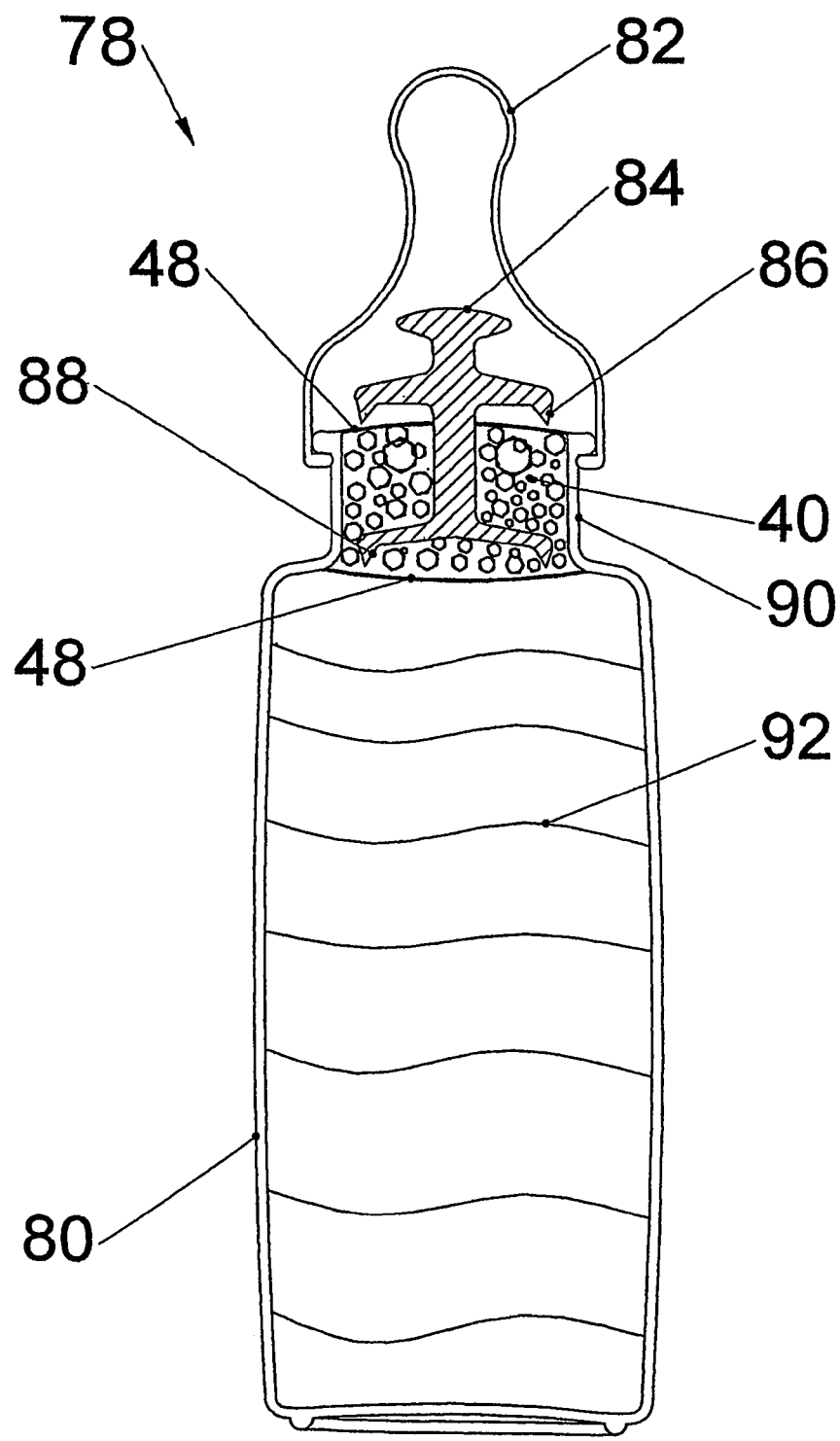
FIGS. 5A/B/C/D illustrate alternate embodiments and dispositions of the dispenser means of the invention for preparing a beverage drink in a baby bottle.

FIGS. 5A/B/C/D illustrate alternate embodiments and dispositions of the dispenser means of the invention for preparing a beverage drink in a baby bottle.

Referring now to FIG. 5A, a container, comprising a baby bottle 80 with a sealed, nipple cover 82 and a dispenser means 84 having both an upper punch 86 and a lower punch 88 for perforating both upper and lower thin membranes 48. Enclosed between thin membranes 48 in the neck 90 of baby bottle 80 is a beverage preparation 40. Although any beverage preparation suitable for use with infants may be used, in a preferred embodiment of the invention, beverage preparation 40 is powdered milk or milk substitute. The baby bottle 80 is prefilled with potable liquid, preferably treated water 92. The nipple cover 82 is commonly a soft rubber or plastic and compressible. Finger action against the dispersal means 84 causes the lower punch 88 and upper punch 86 to perforate the thin membranes 48 and infuse their contents into the base liquid 92, such as water. The drink is ready to give to an infant after shaking the container 78 by hand.

Figure 5B:
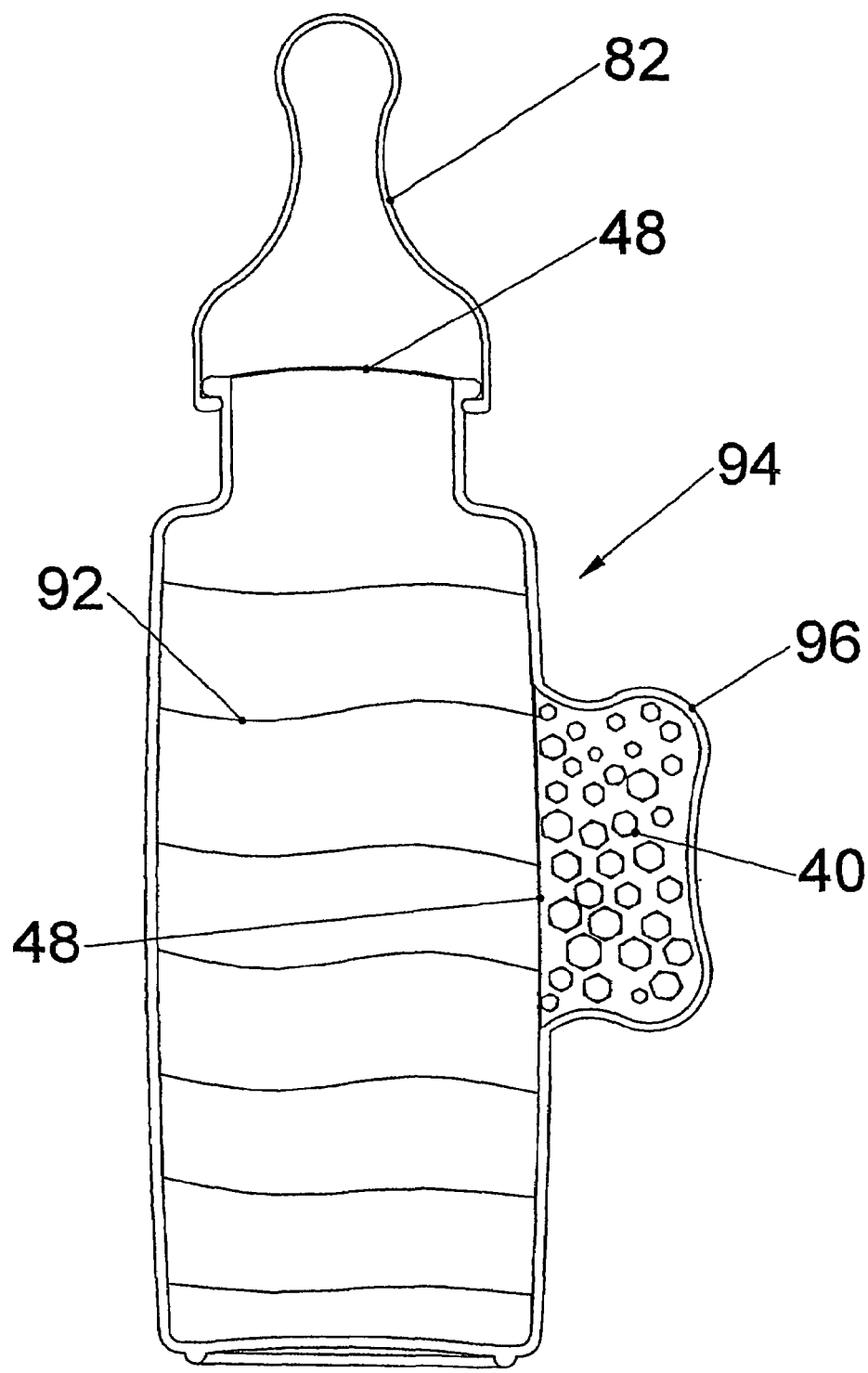

FIG. 5B illustrates an alternate embodiment of the invention for preparing a beverage drink for infants.

The beverage preparation 40 in the embodiment of the invention shown in FIG. 5B are stored in a sealed chamber 96 comprising a hollow handle element of baby bottle 94. The contents of sealed chamber 96 are dispensed into the potable base liquid, such as treated water 92, through a thin membrane 48 which is a common surface between the bottle 94 and the beverage preparation chamber 96 which is formed as a handle on the side of bottle 94. The other elements of the embodiment of the invention are as described in relation to FIG. 5A.

Figure 5C:
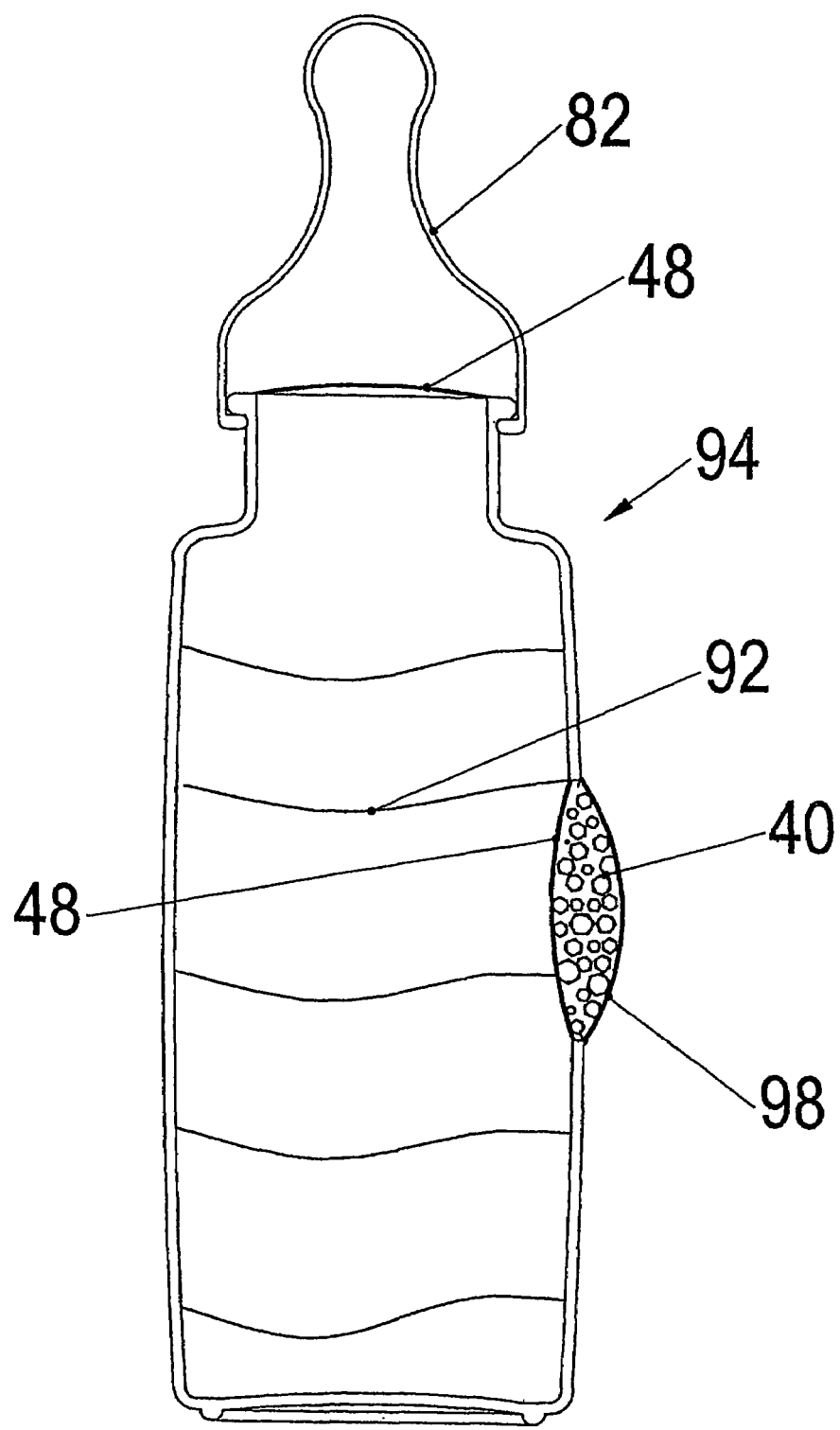

FIG. 5C illustrates yet another embodiment of the invention for preparing a beverage drink for infants.

Baby bottle 94 in this embodiment of the invention is provided with a side-disposed dome-like, sealed chamber 98 storing measure amounts of an additive ingredient 40 for mixture with the treated water 92. Finger pressure on the sealed chamber 98 activates a dispenser means (see above) perforating the thin membrane 48. In a preferred embodiment of the invention, thin membrane 48 comprises aluminum foil although other metallic foils are also usable. Shaking the bottle 94 is sufficient to prepare the beverage for drinking.

Figure 5D:
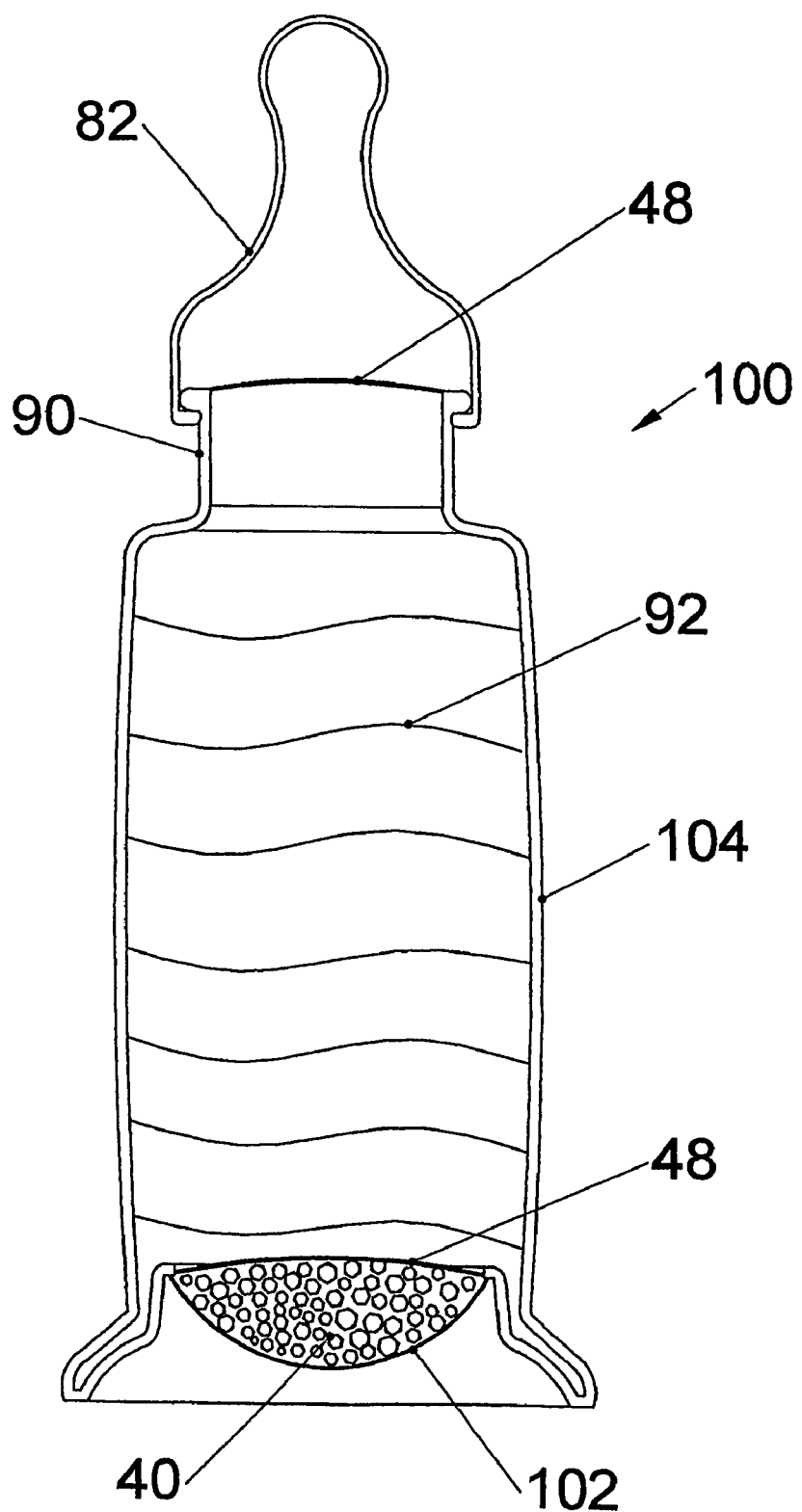

FIG. 5D illustrates a further embodiment of the invention for preparing a beverage drink for infants.

Baby bottle 100 is provided with a sealed chamber 102 which accommodates at least one pocket of beverage preparation 40 for mixing with the potable base liquid 92 supplied with the bottle 100. The sealed chamber 102 is disposed in a recess formed in the bottom portion of the bottle by the extension of sides 104. Other features and elements are as described heretofore for similar embodiments of the invention.

Figure 6:
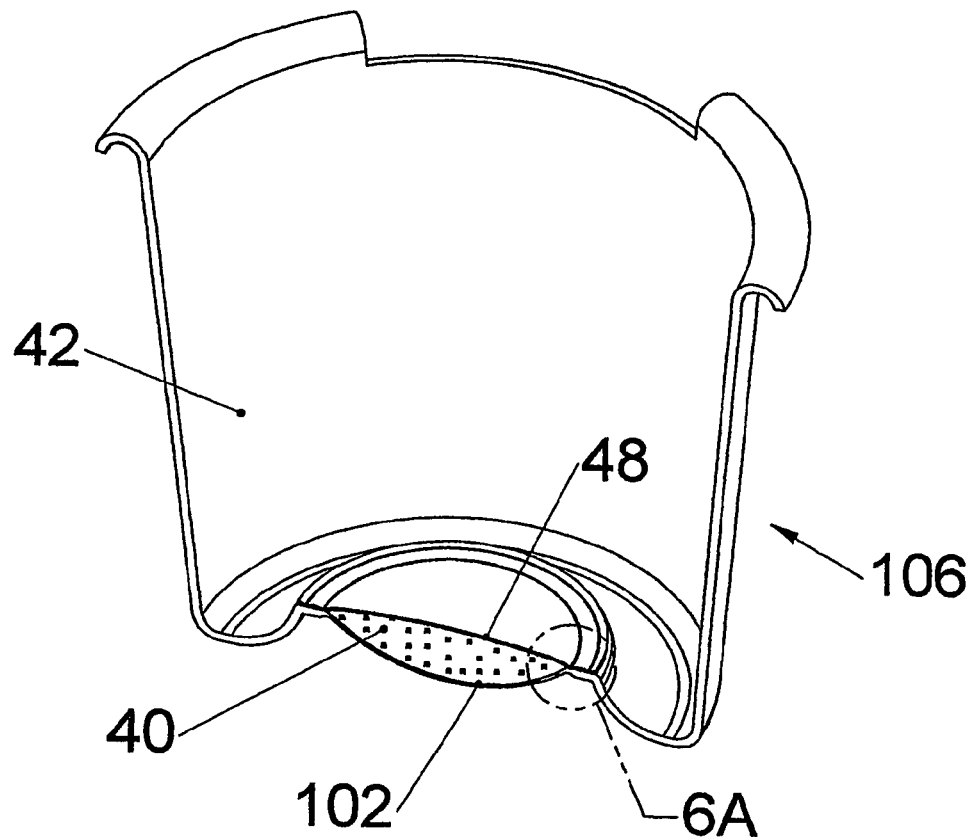
FIG. 6 is an isometric, cutaway view a cup element of the invention provided with a sealed chamber containing beverage preparation disposed on the underside of the container, such as in FIG. 5D.

FIG. 6 is an isometric, cutaway view of a cup container provided with a sealed chamber containing a beverage preparation disposed on the underside.

By way of example, FIG. 6 shows a container, such as a cup 106, similar to that shown in FIGS. 1-4, but with a sealed chamber 102 containing beverage preparation 40 disposed on an underside of the container, similar to the example for a baby bottle shown in FIG. 5D. Because the dry ingredients in the sealed chamber 102 are disposed on the underside of the container, problems may arise in preventing unwanted diffusion of the base liquid, such as water 92 (see FIG. 5D), prior to the desired time for preparation of a beverage for drinking.

To overcome this problem or potential problem, the bottom portion of the container is constructed with an internal welding ring 108 and an external welding ring 110 for extra security in guarding against unwanted seepage. The two welding rings 108, 110 improve the isolation between the base liquid, such as water 92 and the beverage preparation 40, commonly powders or dried materials, by increasing the distance the water 92 must pass by diffusion through the plastic material, generally used in fabricating a drinking container.

Figure 6A:
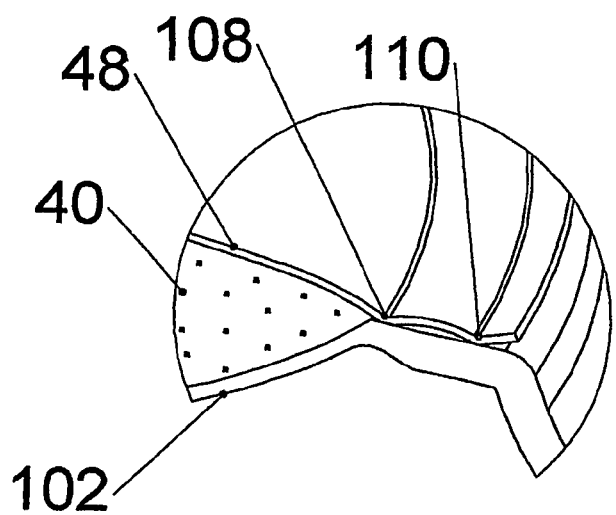
FIG. 6A is an enlarged, detail view of a portion of the construction of the container from FIG. 6.

FIG. 6A is an enlarged, detail view 6A of a portion of the construction of the container from FIG. 6.

FIG. 6A shows close details of the two bonding rings 108, 110 of joining. The aluminum foil thin membrane 48 in the upper part of the sealed compartment, in a preferred embodiment of the invention, is sized to overlap part of the inside base of the container, in this case cup 106. Using a heat bonding or welding technique known to those skilled in the art, the beverage preparation powder is well isolated from the liquid in the container. Such a method applied to a drinking cup is obviously applicable to any container made of similar material and with like disposition of a dry ingredient in close proximity to a liquid.

Figure 7:
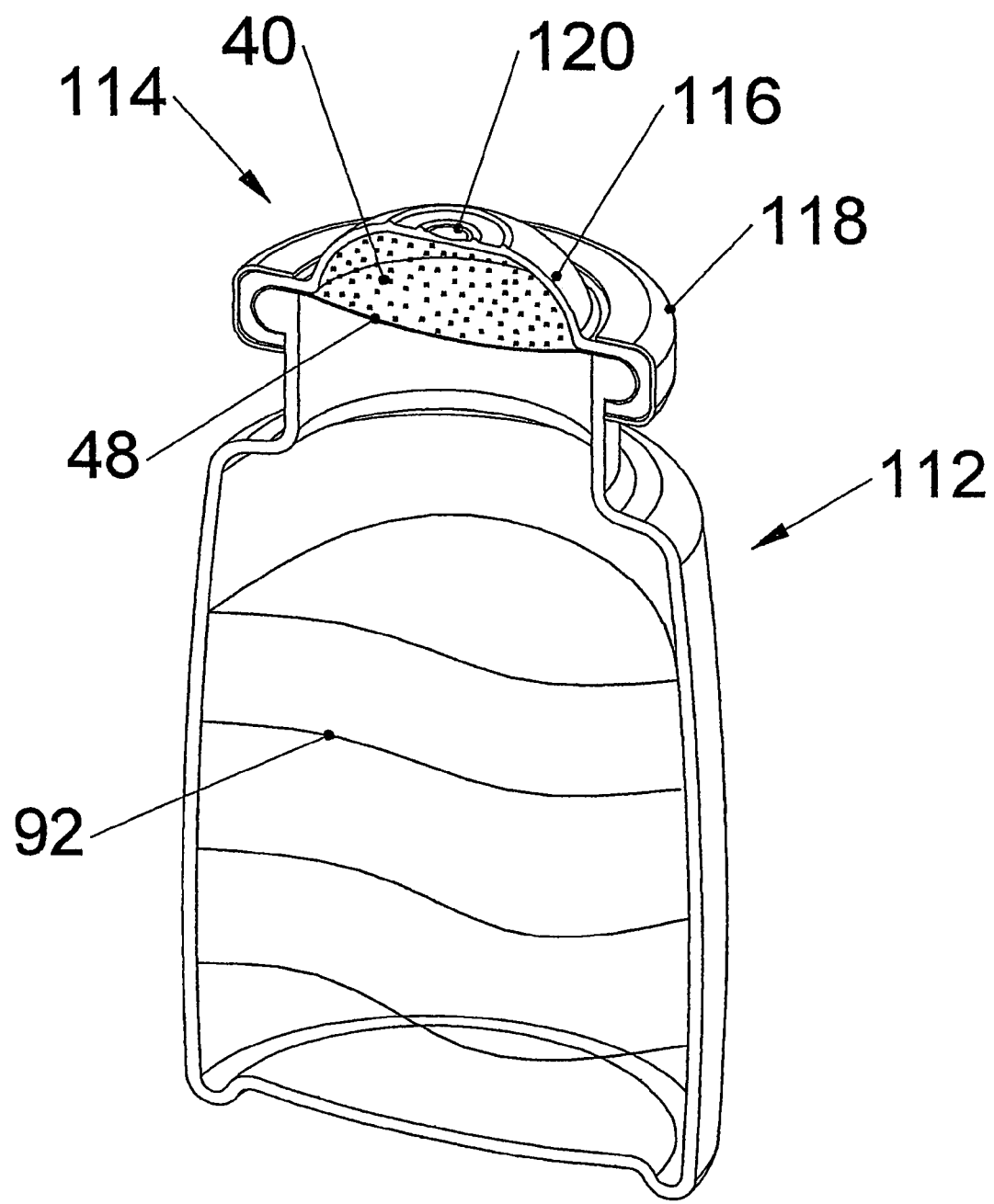
FIG. 7 is an isometric, cross-section view of an embodiment of the invention for a beverage preparation system for medicinal potions.

FIG. 7 is an isometric, cross-section view of an embodiment of the invention for a beverage preparation system for medicinal potions.

A container, such as medicine bottle 112 is provided with a cover 114 comprising an elastic (rubber-like) dome 116 under which an additive ingredient 40, such as medicinal powder, is stored. The underside of the sealed chamber is defined by a thin membrane 48, such as aluminum foil, which is perforated by a dispersion means (such as described heretofore in relation to dome-like chamber 38 in FIG. 1) to mix the medicinal powder 40 with a base liquid 92, as required to prepare a therapeutic potion. The elastic dome 116 is secured to the top of the medicine bottle 112 by a metallic sealing ring 118. An injection piercing point 120 is conveniently provided at the apex of the elastic dome 116 for sterile injection of material into the sealed bottle 112. The cover 114 is not removable as a metallic sealing ring 118 locks the bottle and prevents unsanitary reuse.

To allow passage of the medicinal powder 40 into the base liquid 92 in medicine bottle 112, the thin membrane 48 is perforated either by pressing the elastic dome 116 against the powder additive ingredient 40 activating a dispersion means as heretofore described. The dispenser means breaks the thin membrane 48 along the welding line at its built-in break points. Alternatively, an additional ring (not shown) provided with sharp ribs may be disposed between the rubber-like elastic dome 116 and thin membrane 48 and operated by depressing elastic dome 116.

Figure 8:
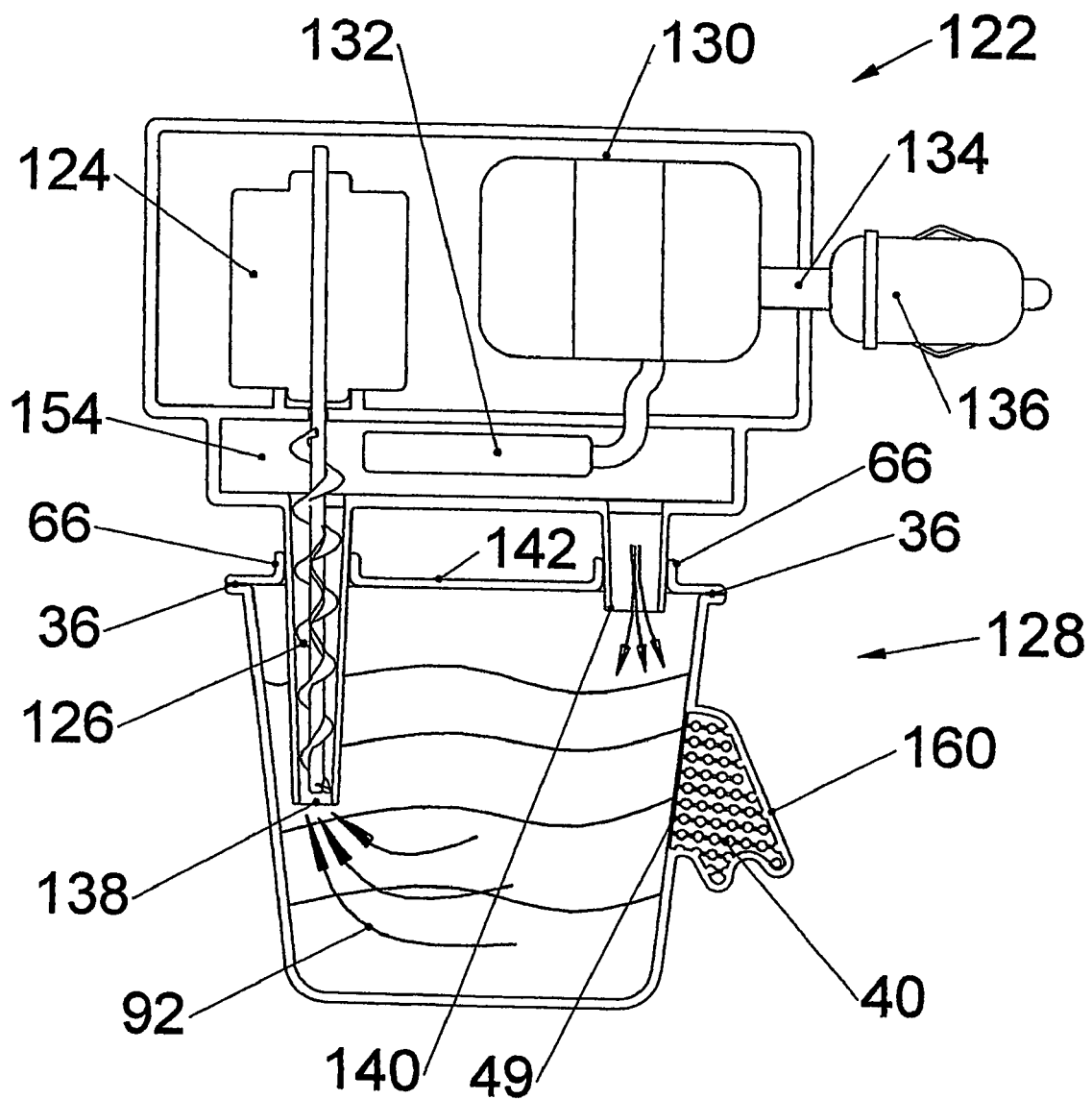
FIG. 8 is a cross-section view of an embodiment of the system of the invention for preparing a hot or cold beverage drink in a cup container utilizing a separate heating/cooling unit.

FIG. 8 is a cross-section view of an embodiment of the system of the invention for preparing a hot or cold beverage drink in a cup container utilizing a removable, portable, heating/cooling unit.

A heating/cooling unit 122 is provided, comprising a pump 124 connected to and driving a pump impeller 126 for drawing up the water 92 from a cup 128. A controller device 130 for interfacing with a power means (not shown) is attached to a heating/cooling element 132, such as a Peltier or equivalent heating/cooling element. Alternatively, only a heating element is used. The controller device 130 is also connected by a cable 134 to a standard automobile cigarette lighter jack 136 to connect with a power means, such as a car battery. The controller device 130 is also adaptable for conventional electrical usage if the portable beverage preparation system is operated at home or in the office.

The pump impeller 126 draws water 92 (indicated by upward curved arrows) into a water inlet 138. The water 92 from cup 128 is made to flow over the surface of heating/cooling element 132 disposed in a small heating chamber 154 and is then recycled back into the cup 128 through a water outlet 140. The process continues until the water 92 has reached a desired temperature as controlled by controller device 130 and then shuts itself off. Alternatively, a user can manually stop the heating/cooling cycle at any point in time. The heating/cooling unit 122 is then removed from the openings 66 in cover 142 and the beverage drink is ready to imbibe.

Figure 9A:
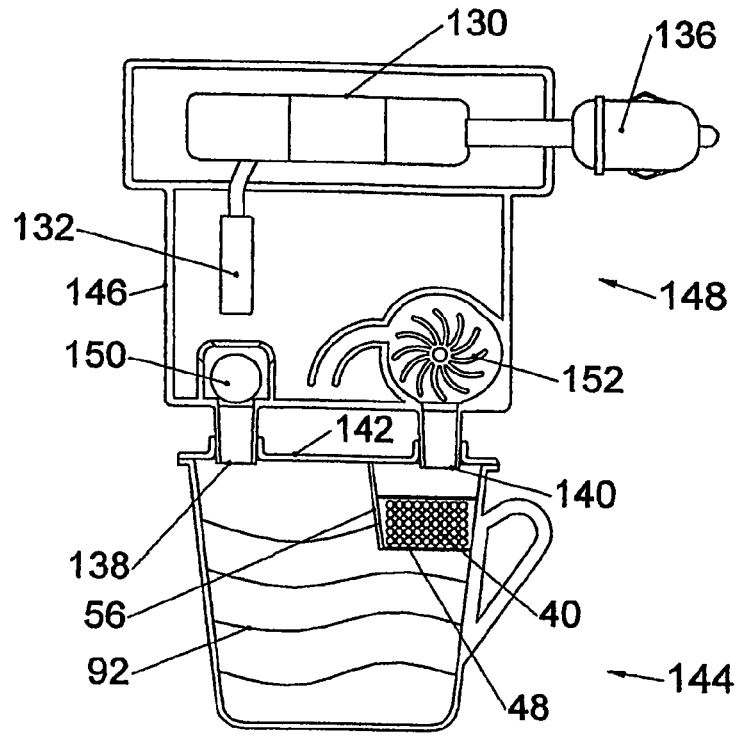
FIGS. 9A/B/C are cross-section views of the steps in another beverage preparation system in accordance with the principles of the present invention.

FIGS. 9A/B/C are cross-section views of the steps in another beverage preparation system in accordance with the principles of the present invention.

As shown in FIG. 9A, a container, such as cup 144, containing a sealed chamber 56 of a measured amount of beverage preparation 40, is connected physically to a heating unit 148 by inserting protruding ports 138 and 140 into matching openings in the cover 142 of cup 144. The heating unit 148 comprises a controller 130 in communication with a power source (not shown), utilizing a connector, such as an automobile cigarette lighter plug 136. A heater element 132 is disposed in a heating chamber 146 separated from the power controller 130 and related elements in heating unit 148.

Figure 9B:
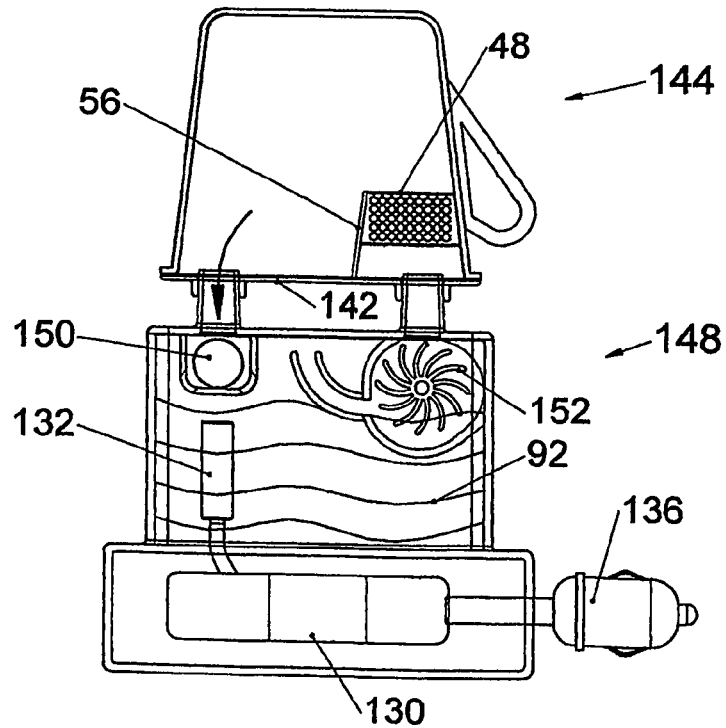
Figure 9:
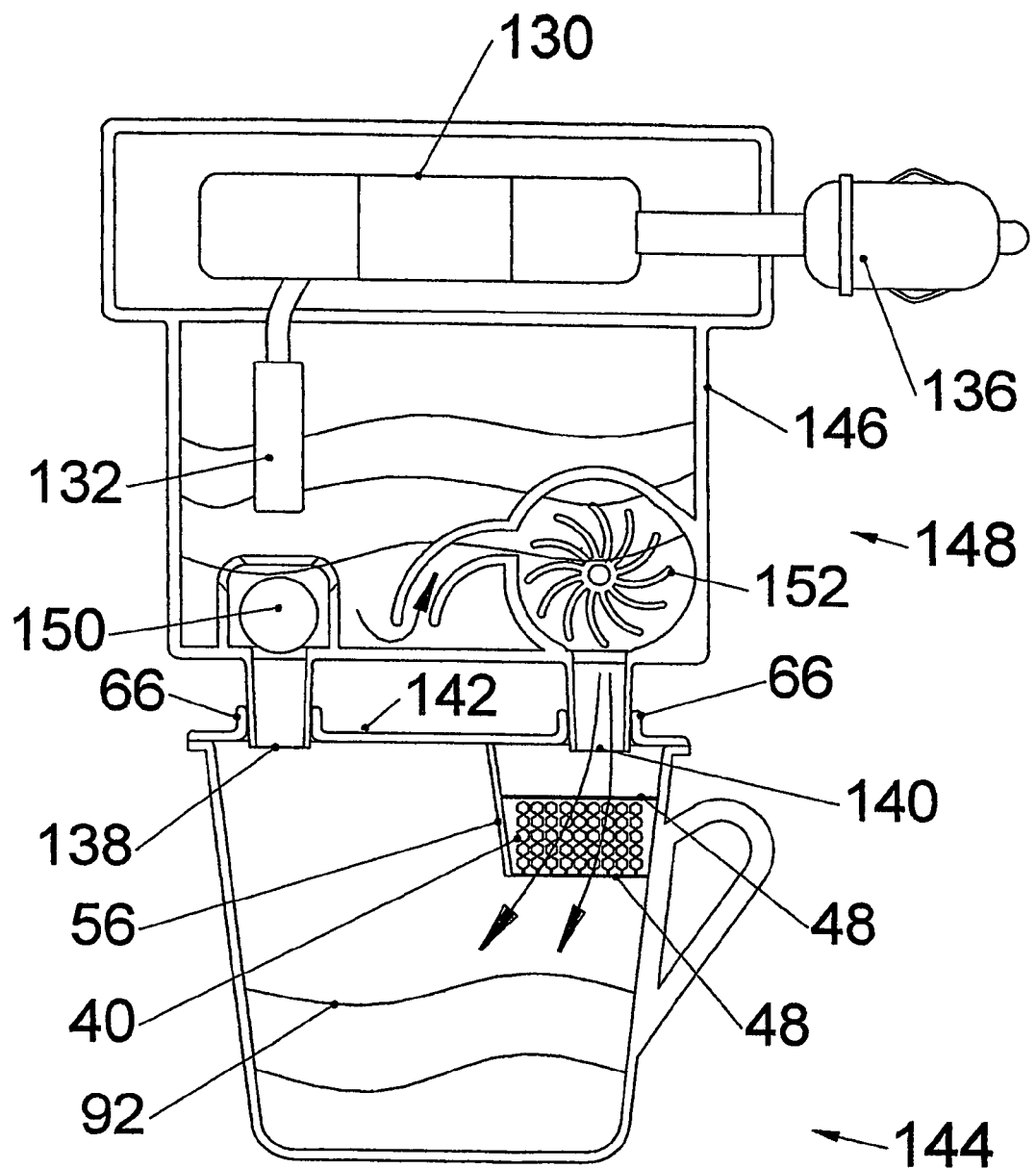

In FIG. 9B, the entire cup 144 and heating unit 148 are turned upside down so that the water in cup 144 will move to the heating chamber and will be heated.

In FIG. 9C, the final stage of beverage preparation, the entire cup unit 144 and heating unit 148 are turned back with the cup unit 144, right side up under the heating unit 148. A one-way valve 150 prevents the water 92 from returning to the cup 144 except at the pump 152 outlet 140. The high-pressure pump 152 is activated to open, by the force of water pressure, the thin membranes 48 enclosing beverage preparation 40. In a preferred embodiment of the invention, thin membrane 48 is made of aluminum foil. The heated water flows through the beverage preparation 40 held inside cup 144 and fills cup 144 with the drink mixture. Alternatively, depending on the disposition of the sealed chamber 56 and the orientation of the thin membranes 48 sealing-in the beverage preparation 40, a dispenser means as hereinbefore described is utilized to mix the now heated water 92 with the beverage preparation 40. The heating unit 148 is then removed from the cup 144 and the prepared heated beverage, is ready to drink.

Figure 10A:
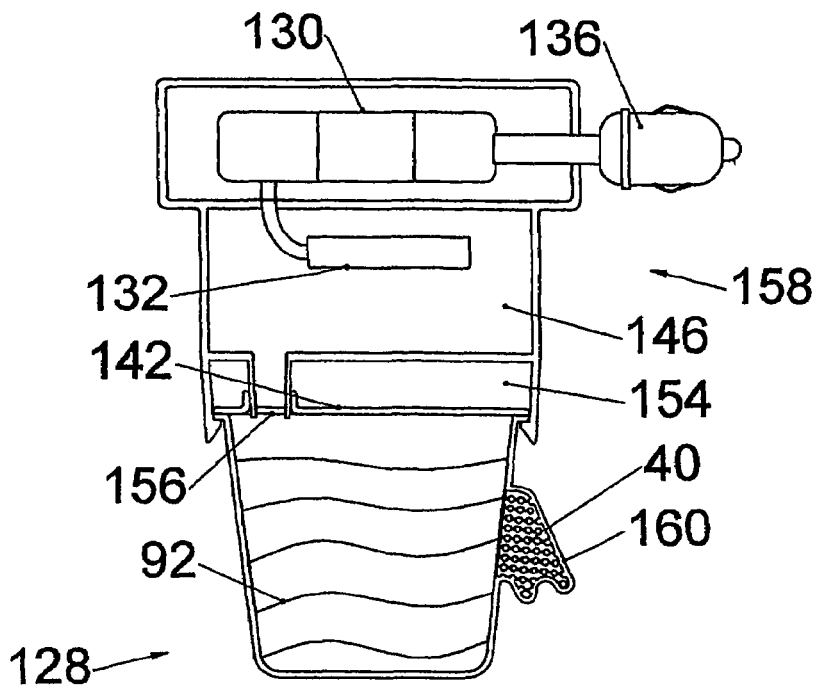
FIGS. 10A/B are cross-section views of yet another embodiment of the system of the invention.

FIGS. 10A/B are cross-section views of another embodiment of the system of the invention.

Referring now to FIG. 10A, a container, such as cup 128 is connected to a heating unit 158 with a snap-type connection so that a port 156 in heating unit 158 fits snugly into a matching opening in the cover 142 sealed onto cup 128. The cup 128 is then inverted so that water 92 within the cup 128 is forced by gravity into a heating compartment 146 where it is heated by a heater element 132 as described heretofore in respect of the system of FIG. 9. When the water has been heated, the cup 128 is returned to an upright position and the user removes the heating unit 158.

Figure 10B:
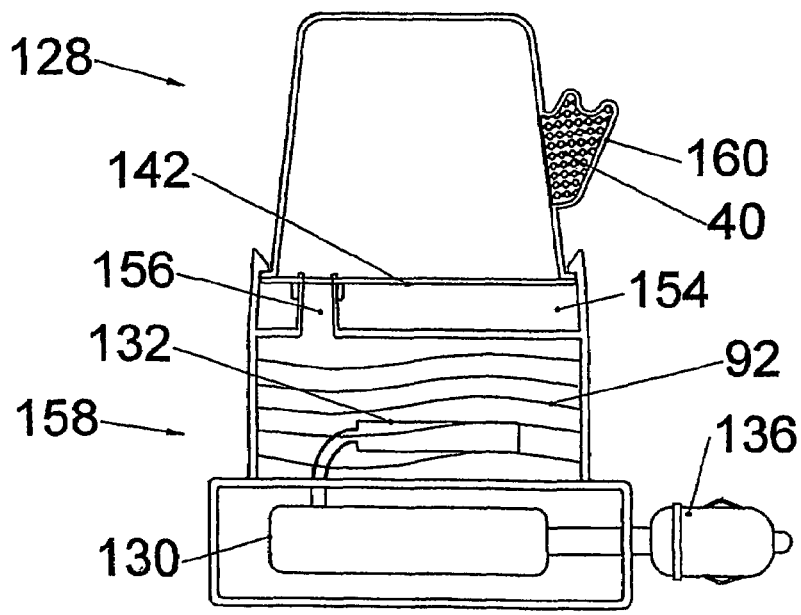

Illustrated in FIG. 10 is an accordion-like protuberance embodiment of the sealed chamber 160 containing the beverage preparation 40. The beverage preparation is deployed by a dispenser means (not shown) embedded in the beverage preparation 40 as hereinbefore described. The user closes the openings in the sealed cover 142 with small covers provided, and shakes the cup 128 by hand a few times to mix the beverage thoroughly before drinking.

Figure 11:
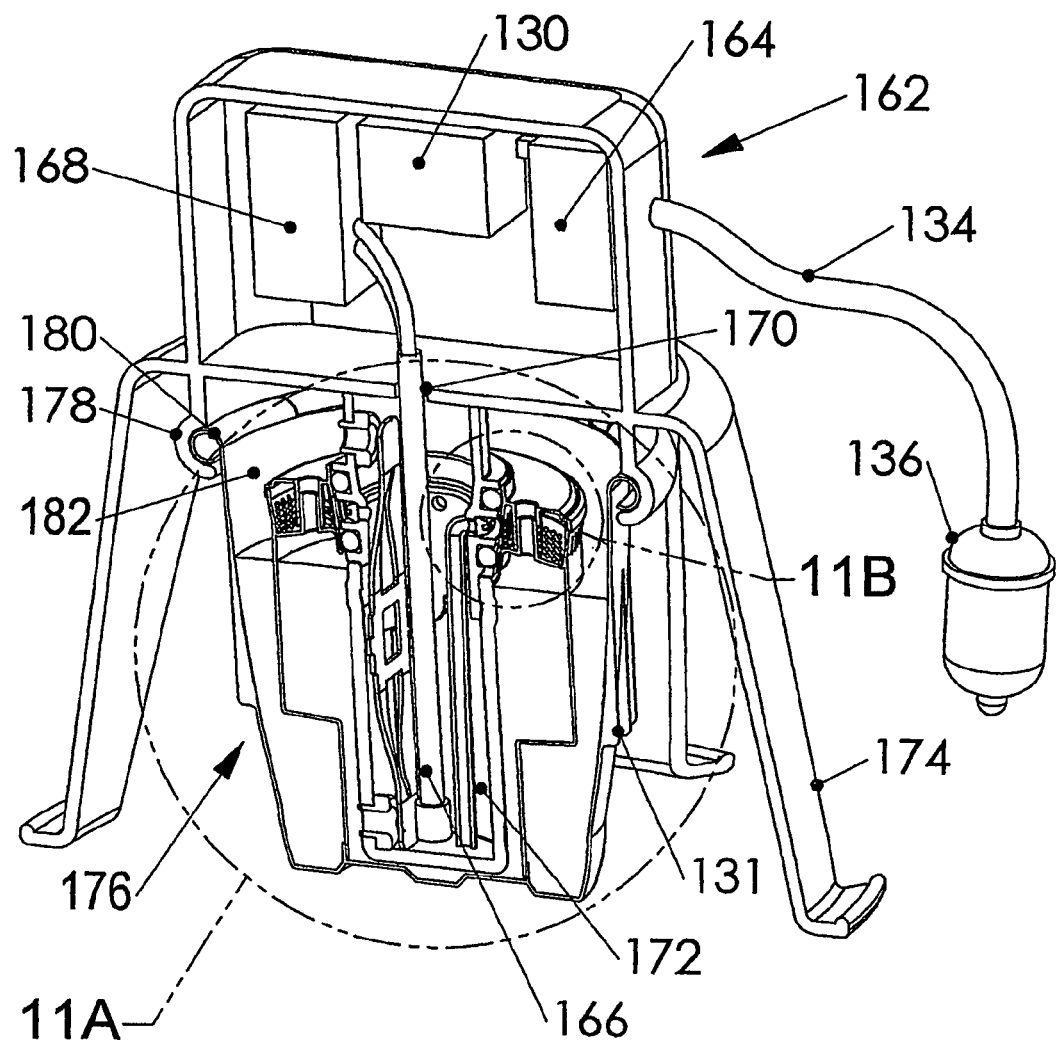
FIG. 11 is an isometric cross-section view of a portable beverage preparation device connected to a heating unit in accordance with another embodiment of the invention.

FIG. 11 is an isometric cross-section view of a portable beverage preparation device constructed in accordance with another embodiment of the invention.

The portable beverage preparation system of the invention in the embodiment of the invention of FIGS. 11-12, 14-16 includes a container, such as cup unit 176 and a heating unit 162 utilized when making a brewed beverage.

Referring to FIG. 11, the heating unit 162 includes a power interface unit 164 connected to a power cord 134 in communication with a power plug, for example, an automobile cigarette lighter plug 136. The power interface unit 164 is connected to controller 130 which operates a switch 168 to turn the heating unit 162 on or off. The power source may be, for example, a conventional (domestic, commercial, industrial) electrical outlet, a battery source or an automobile cigarette lighter. Heating unit 162 also includes a heating element 184 containing a heater rod 166 which is connected to the switch 168 through a waterseal opening 170. The heater rod 166 is controlled from a controller unit 130 which can detect changes in temperature vs. time and shut down the heating element if there is no more water to heat, if the water has reached a desired temperature, or if a used cup is accidentally connected to the system which might be out of fresh beverage preparation powder.

The heating unit 162 is provided with legs 174 for allowing the heating unit 162 to stand in a self-supporting manner (and for example, supporting a cup 176 when the heating unit 162 is in operation with the cup 176). The heating unit 162 is provided with lip segments 178, which are preferably discontinuous and rounded, and dimensioned to form a bayonet type connection with the corresponding lip segments 180 of the outer cup 182. The outer cup 182 is provided with convenient ribs 131 for grasping the cup unit 176 when it is filled with a hot prepared beverage drink.

Figure 11A:
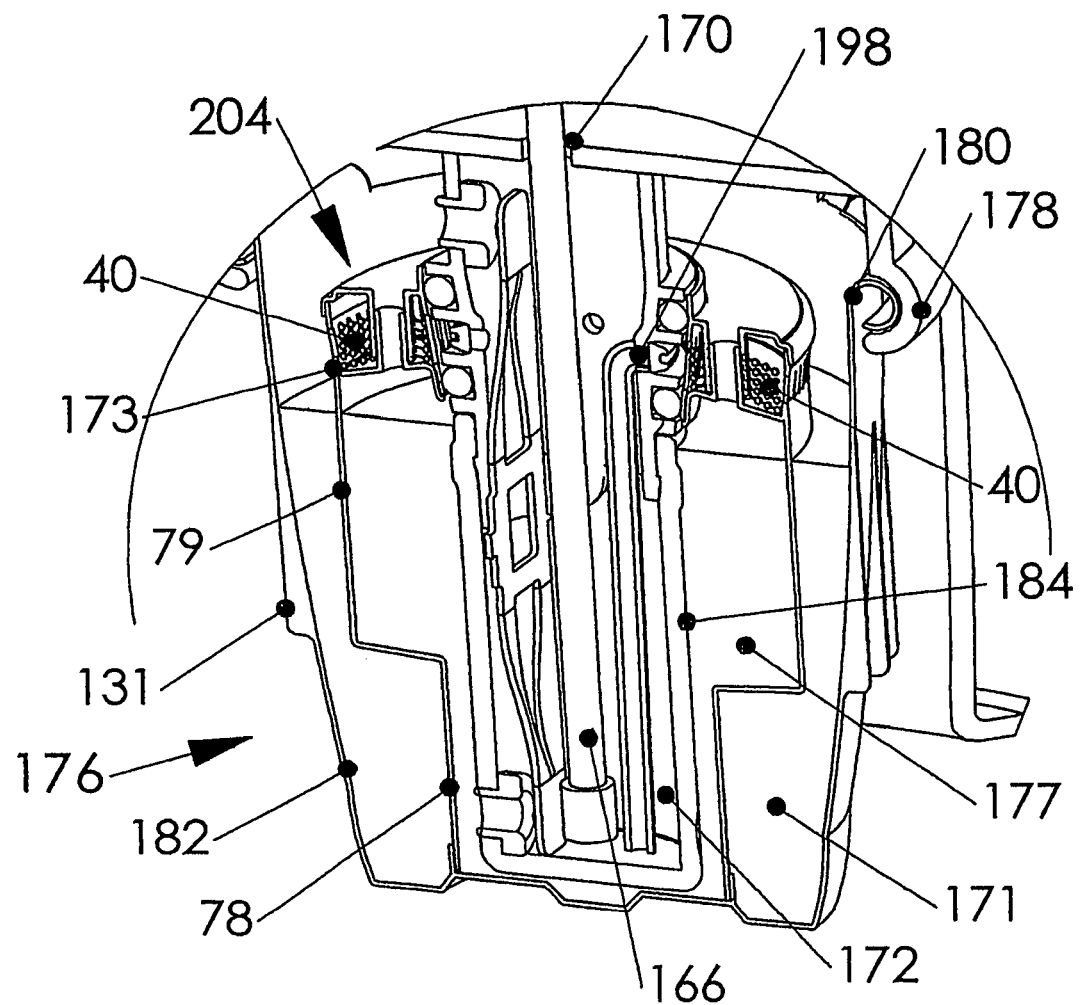
FIG. 11A is an isometric, cross-sectional view of detail 11A from FIG. 11.

FIG. 11A is an isometric, cross-sectional view of detail 11A from FIG. 11.

Figure 11B:
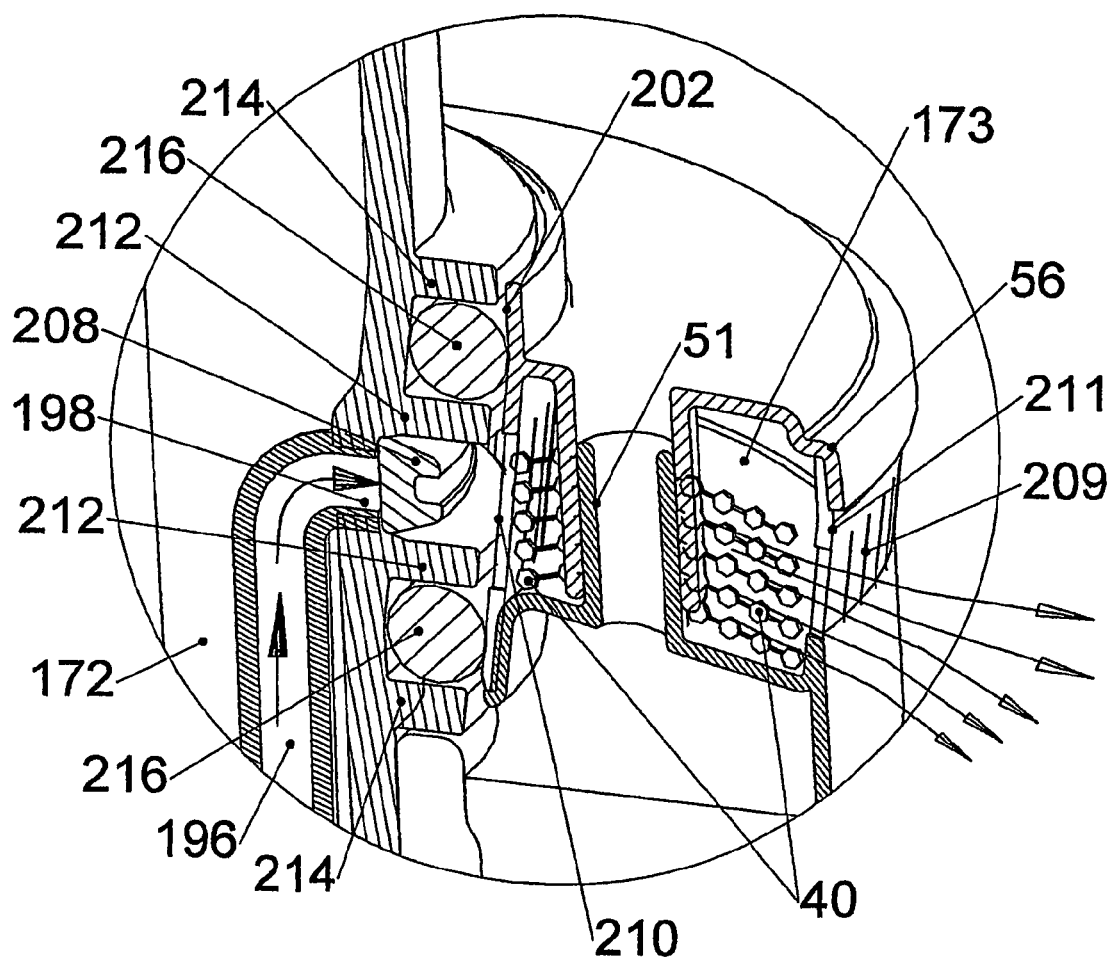
FIG. 11B is an enlarged, isometric, cross-sectional view of detail 11B from FIG. 11.

FIG. 11B is an enlarged, isometric, cross-sectional view of detail 11B from FIG. 11.

Turning to FIG. 11A, the cup unit 176 includes an outer cup 182 and inner cup 78 with a space between them, defining an outer chamber 171. The inner cup 78 is typically adhered to the outer cup 182, by ultrasonic welds, friction fits, adhesives or the like, and may be designed to be separable therefrom by small forces from a user. The inner 78 and outer 182 cups are typically coaxial (an also typically coaxial with the heating element 184 of the heating unit 162).

This outer chamber 171 typically receives the brewed (steeped, etc.) beverage. Outer cup 182 may be provided with isolation ribs 131 for protecting the fingers of the user, and for providing gripping elements. The outer cup 182 terminates in lip segments 180. These lip segments 180 are preferably discontinuous and rounded so as to form a bayonet type connection with correspondingly shaped portions 178 of the heating unit 162.

Figure 14:
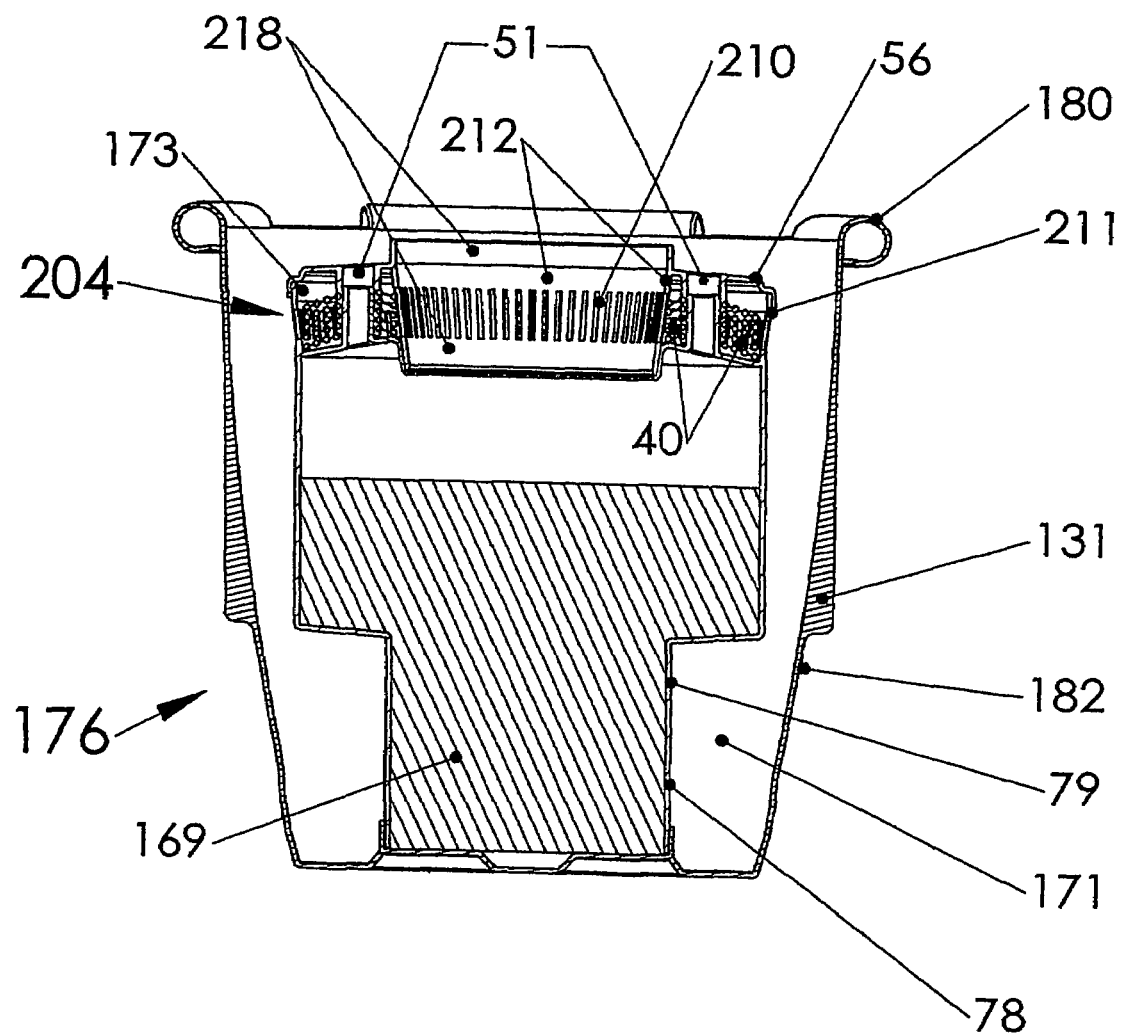
FIG. 14 is a cross-sectional view of the cup of FIG. 11, including a brewing element.

The inner cup 78 includes a body 79 (see FIG. 14) and a brewing element 204, typically integral with the body 79. The interior of the inner cup 78 serves as an inner chamber 169 (FIG. 14). The inner chamber 169 (represented by filler lines) is typically dimensioned so as to receive the heating element 184 and to hold water (not shown) or other similar liquid.

The brewing element 204 is, for example, a rim along the upper circumference of the inner cup 78. It extends inward, to define a pocket 173, typically ring shaped, between inner 202 and outer 211 walls (see FIG. 11B), for holding (enclosing) beverage preparation 40 for beverage preparation (such as chopped, ground, powdered, edible materials, or materials consolidated in the form of rings, cubes, capsules, balls or the like). These preparations may be ground coffee, espresso, tea, hot chocolate, sugar, and the like. These preparations may either be inserted into the pocket 173 by the user or prepackaged by a manufacturer.

The inner wall 202, typically defines a central opening 218 (see axial line in FIGS. 15 and 16), that is typically conical with a circular bore. This central opening 218 is for example, of dimensions suitable for receiving the heating element 184 of the heating unit 162 in a relatively snug and sealing manner, for support. To enhance this support, the inner wall 202 is for example, inwardly tapered (in the downward direction). Lateral bores 51, extending longitudinally through the brewing element 204, allow for venting (to the ambient environment) of the liquid in the inner chamber 177.

The inner 202 and outer 211 walls include openings 209, 210, respectively. These openings 209, 210 typically serve as fluid inlets and outlets, for the hot liquid, for example water, as it passes from the inner cup 78 through the heating element 184 to the outer chamber 171 of outer cup 182, contacting the beverage preparation 40 of the beverage preparation in the pocket 173 during this passage.

The brewing element 204 typically includes a cover 56. This cover 56, in order to enable development of pressures necessary for hot liquid to flow through the beverage preparation 40 in the beverage preparation (for example, ground coffee or espresso) in the pocket 173, typically encloses the pocket 173 and is typically sealed to the brewing element 204, by reliable methods such as ultrasonic welding. The cover 56 is dimensioned so as to frictionally engage the remainder of the brewing element 204 prior to sealing.

Figure 12:
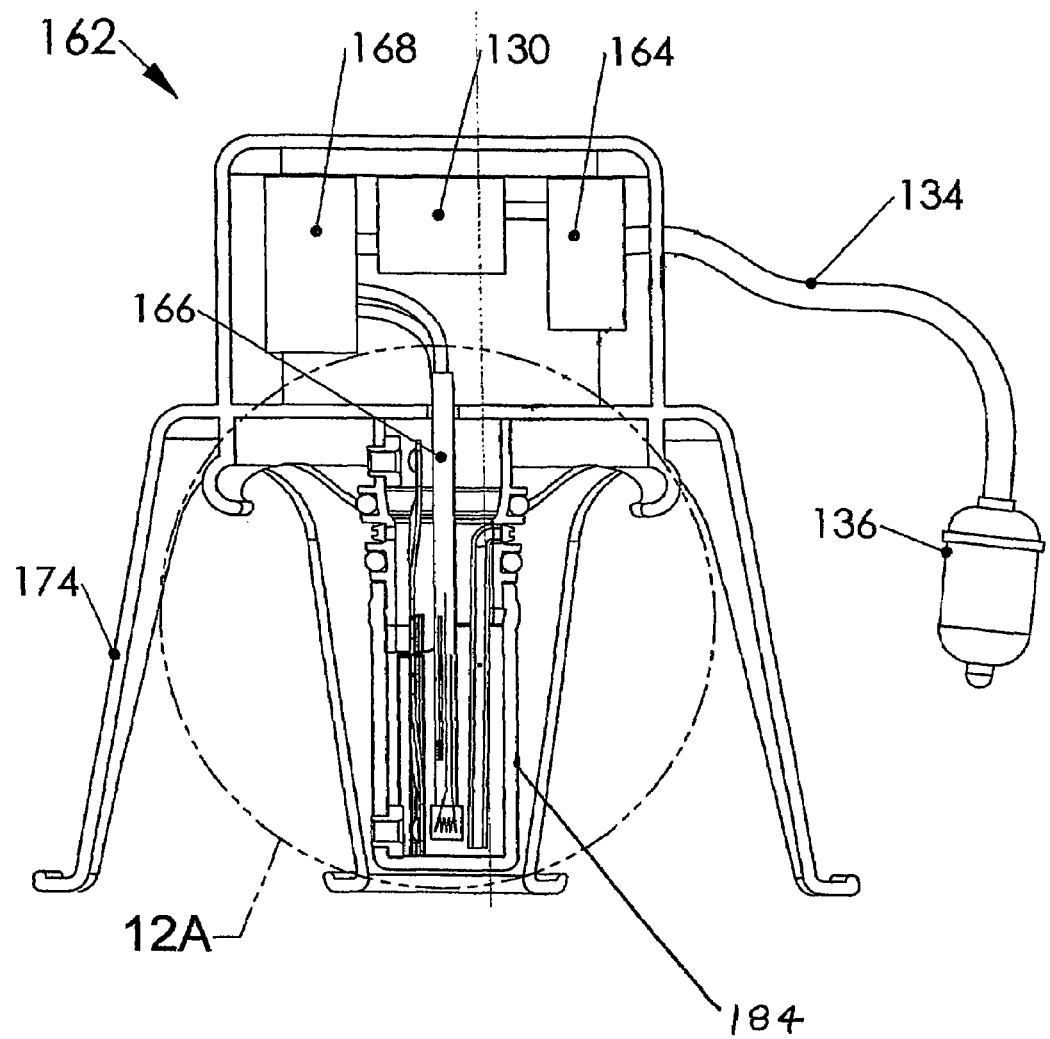
FIG. 12 is a cross-sectional view of the portable heating unit of FIG. 11.
Figure 12:
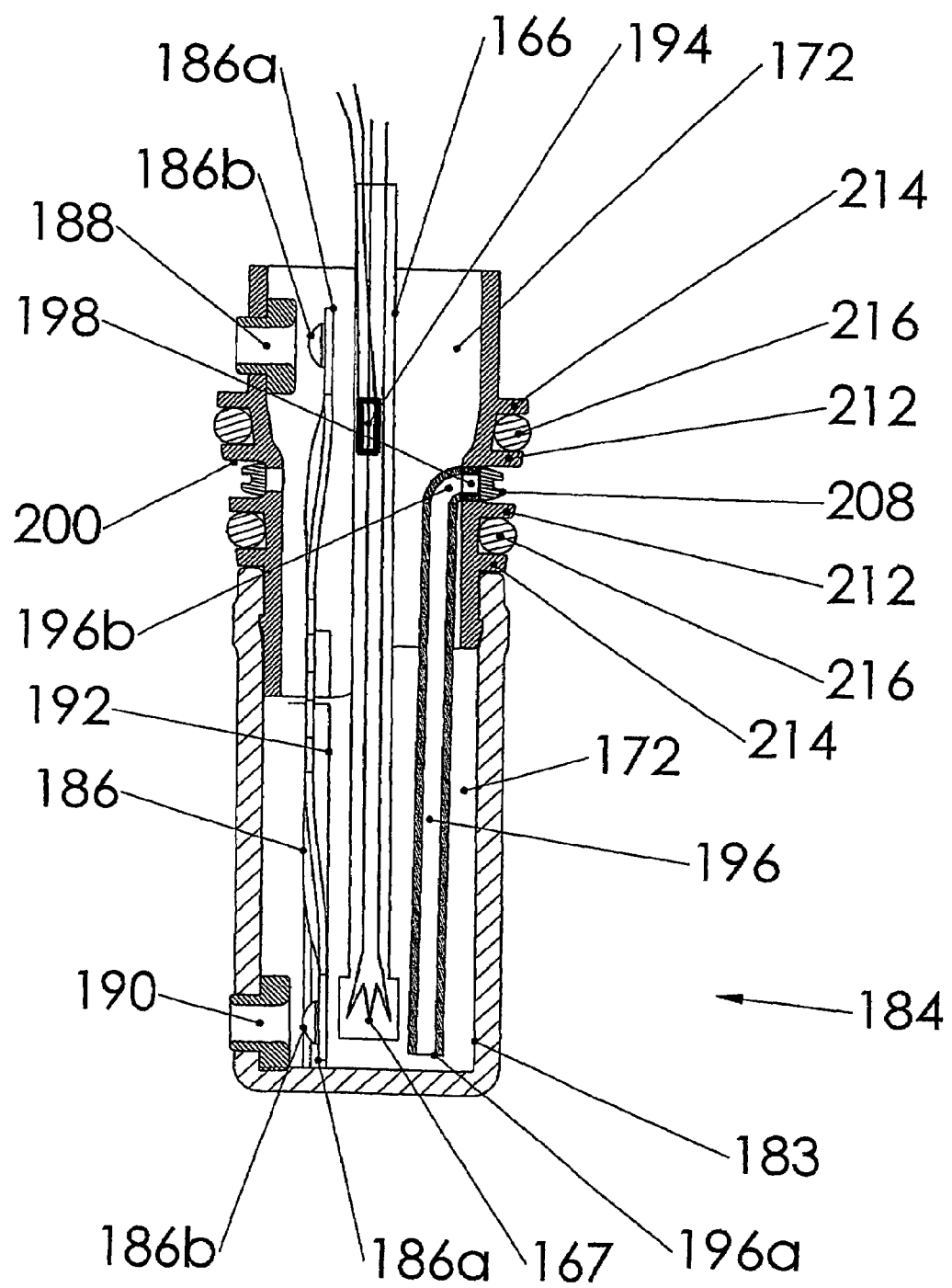

FIG. 12 is a cross-sectional view of the power and heating units shown independently of the cup container from FIG. 11. Similar elements and features are indicated by like designations of numerals.

FIG. 12A shows a detailed, enlarged, cross-sectional view of a heating element 184 from FIGS. 11 and 12 which includes an interior boiling chamber 172. A heater rod 166 extends from a switch 168 (FIG. 12) into chamber 172 for heating the liquid that is admitted into chamber 172. Liquid typically enters chamber 172 through openings 190, typically at the lower end of the heating element 184. The chamber 172 also includes openings 188 at the upper end of the heater rod 166, which serve as vent openings (typically during the liquid filling stage in chamber 172).

A valve, for example, formed from a temperature sensitive bimetal strip 186, with ends 186a of areas larger than the respective openings 188, 190 are attached by a snap in action to the heating element 184, for example, by being fitted into slots (not shown) inside heating element 184. Once heated by the hot liquid, the bimetal strips 186 respond to the increased temperature as the ends 186a move outward, with mounds 186b on the ends 186a fitting into the openings 188, 190, so as to seal them. This sealing prevents liquid from flowing out from chamber 172, and seals the chamber 172 allowing for the requisite brewing pressures to develop. These bimetal strips 186 forming the valves are typically such that both ends 186a, and the mounds 186b open and close simultaneously, in response to temperature changes in the chamber 172.

The controller 130 controls the heater rod 166. The controller 130, coupled with a heater coil 167 in the heater rod 166, functions (among its other functions) as a primary, or main sensor for the heating unit 162. The controller 130 includes circuitry for measuring conductivity of the heater coil 167 in the heater rod 166.

Figure 13:
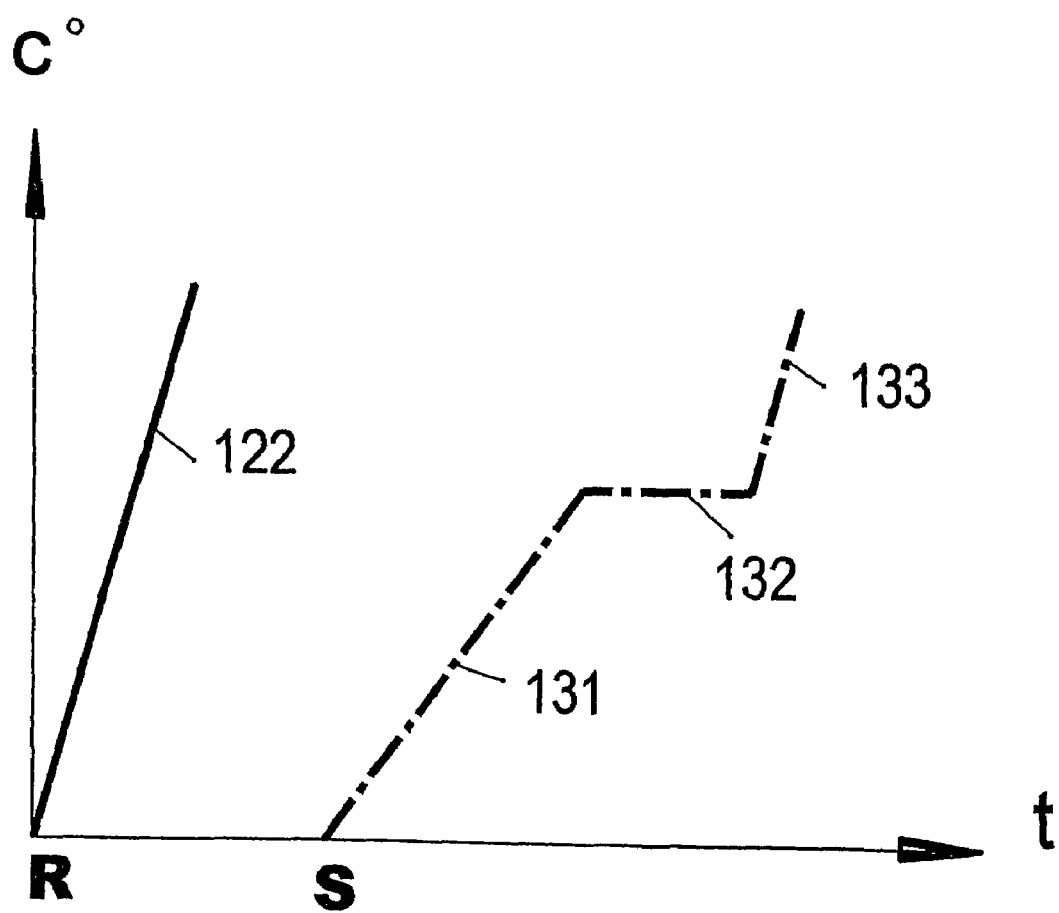
FIG. 13 is a graph comparing temperature variations over time for water heated by the heater element of FIG. 12A under different water conditions.

Temperature sensing is performed to detect changes of heater resistance versus temperature (see FIG. 13). Once a predetermined level has been reached for this value or alternately, a slope, defined by a predetermined temperature rise over a predetermined time, in accordance with the graph shown in FIG. 13, detailed below, has been attained, the controller 130 causes a shut-off of the switch 168 and therefore, the heater coil 167 of the heater rod 166 in the heating element 184.

A sensor 194 is located inside the heater rod 166. This sensor 194 is an auxiliary sensor with respect to the controller 130 (detailed above), as it operates independently of and in parallel with the heater coil 167/controller 130 (detailed above). It will remain in operation should the heater coil 167 become damaged. This sensor 194 is a secondary sensor, placed into the heater rod 166 for safety, to override the primary sensor mechanism, if it becomes become damaged. This sensor signals the switch 168 to shut off the heater rod 166 when predetermined temperatures are reached in the chamber 172.

A tube 196 extends from the lower end within heating element 184, where it has an inlet 190 to the upper end of chamber 172. The upper end 196b of this tube 196 terminates in an opening 198, that opens into a collar section 200 of the heating element 184. These openings 198 are positioned proximate the inner wall 202 (see FIG. 11B) of the brewing element 204, such that fluid can flow through the pocket 206 of brewing element 204, as described herein in reference to FIG. 14.

Figure 15:
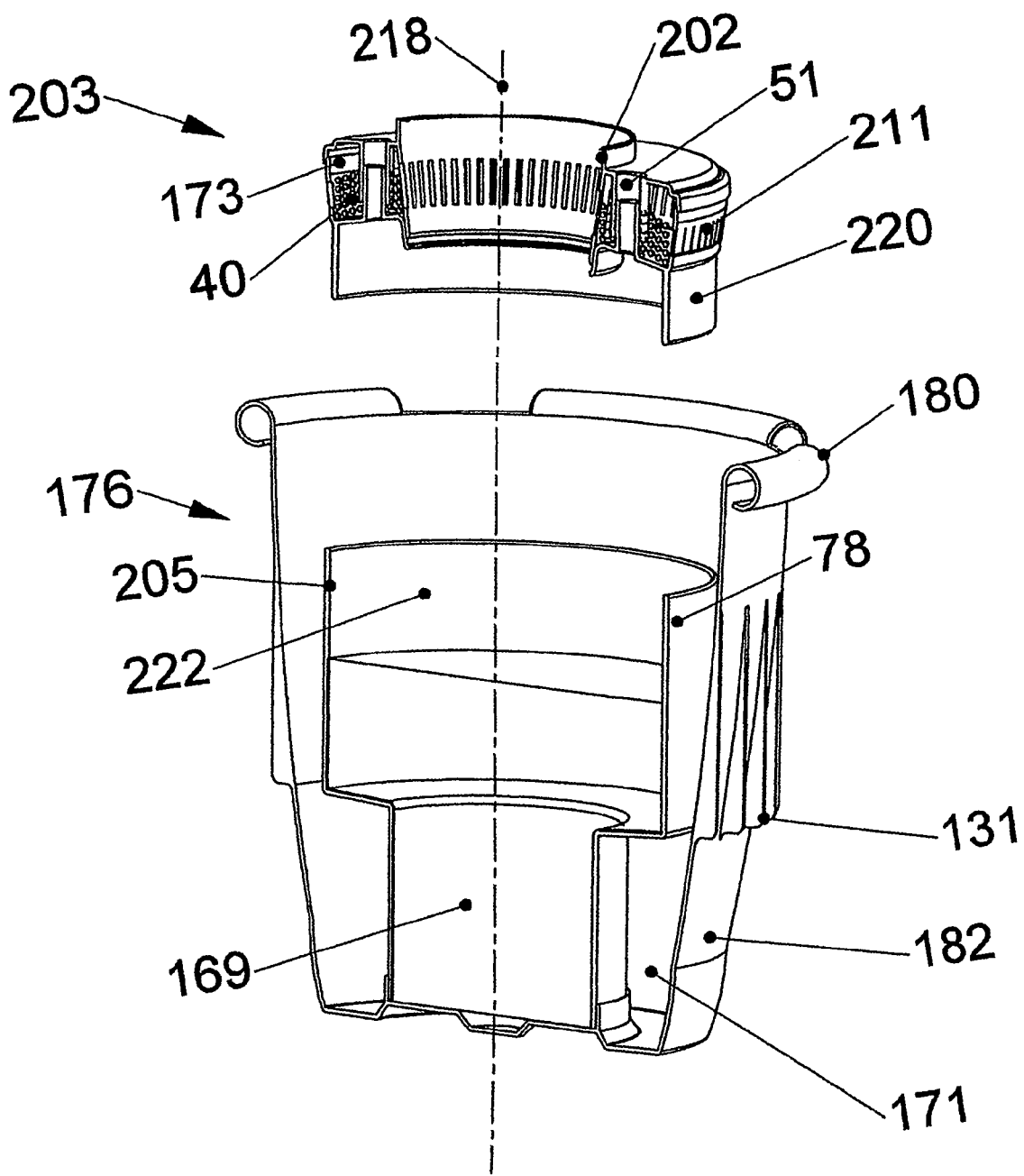
FIG. 15 is an isometric, exploded, cross-sectional view of the cup unit of FIG. 14, but with a removable brewing element.

The collar section 200 shown in FIG. 12A includes a belt 208, typically of an elastomeric material that is flexible, and typically functions as a pressure valve (to prevent fluid backflow into the chamber 172), as its flexibility is such that the belt 208 can be moved outward in response to fluid pressure through the openings, allowing the fluid (for example, hot liquid and steam) to enter the brewing element 204 (see FIG. 14), through openings 210 in the inner wall 202 (see FIG. 15). When the fluid pressure is released, the belt 208 (see FIG. 11B) flexes back to its original position.

Alternately, other pressure valves could be placed at the openings 198.

The belt 208 is supported in its position by inner ribs 212. Outer ribs 214, are spaced apart from the inner ribs 212. The inner 212 and outer 214 ribs run circumferentially around the outer surface of the heating element 184, typically continuously, and support O-rings 216 between them. These O-rings 216 are typically of an elastomeric material and assist in the sealing between the heating element 184 and the brewing element 204, when the heating element 184 is placed through the central opening 218, for operation of the system of the portable beverage preparation device as shown in FIG. 11.

An exemplary operation of the portable beverage preparation system, detailed in FIGS. 11 and 12 will now be described. Here, water is provided to the inner cup 78 of the cup unit 176—in the precise amount so that additional water need not be added, for example, approximately 75 milliliters for preparing an espresso beverage), either by the user, or the user peels off the cover of the alternate cup, detailed hereinbefore. The heating element 184 is inserted in the inner chamber 169 (see FIG. 14), and with the bimetal valve 186 simultaneously open, a small volume of water (for example, 15 ml or ⅕ of the amount of liquid in the inner cup 78, should an espresso be desired) enters the confined space of the chamber 172 through the opening 190. As the heater rod 166 begins to heat the liquid (e.g., water), the bimetal valve 186 close the openings 188, 190, allowing the pressure within the chamber 172 to rise as a result of the steam produced by the heated water.

The raised pressure in the chamber 172 forces liquid (i.e., water) through the tube 196, thereby opening the valve (loosening the belt) 208 allowing a small quantity of pressurized water to exit the chamber 172 through the tube 196 into the brewing element 204 (through openings 210 in the inner wall 202) and through the beverage preparation therein (in accordance with the arrows of FIG. 11B). The now treated fluid leaves the brewing element 204 through openings 209 in the outer wall 211, where it flows downward, into the chamber 171 between the outer 182 and inner 78 cups.

The chamber 172 is now left empty of water and, therefore, the temperature in the chamber 172 rises rapidly. The controller 130 senses the rapid heat rise and turns off the switch 168 for a short period of time. This allows the chamber 172 to cool and therefore allow the bimetal valves 186 to move inward opening the openings 188, 190, thereby allowing the chamber 172 to refill and the process (cycle) to be repeated.

This process (cycle) is repeated for as long as desired. For example, there are about five cycles of approximately 15 ml each for the predefined volume of approximately 75 ml in the inner chamber 169. The process typically continues until the inner chamber 169 of the cup 78 is empty.

Should the process be complete, the user can manually turn off the heating unit 162, typically by a manual switch or the like, coupled to the aforementioned electronics of the heating unit 162 (or can remove the plug 136 from the outlet). Should the heating unit 162 remain on (not shut off manually), it will shut off by itself, as detailed above.

Figure 16:
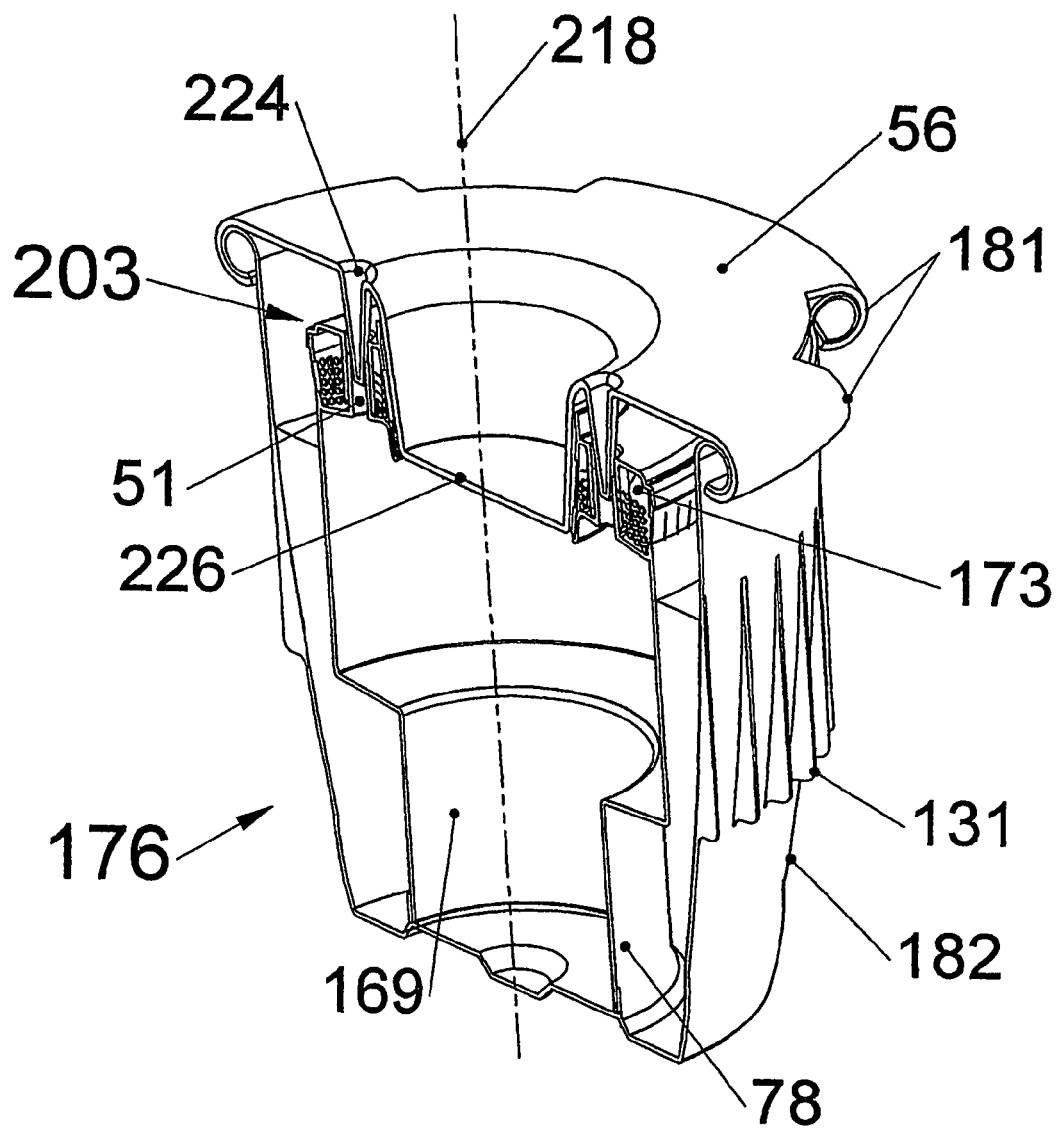
FIG. 16 is an isometric, cross-sectional view of the cup unit of FIG. 14 shown provided with a cover.

The user turns the cup unit 176, so that its lip segments 180 are out of contact with the corresponding lip segments 178 of the heating unit 162. The cup unit 176 can now be removed and separated from the heating unit 162, and the hot drink is ready for the user. Otherwise, once the cup unit 176 has been removed and separated from the heating unit 162, the user may place the cover 56 onto the cup unit 176, such that it holds by a snap-fit, to keep the beverage hot until drinking is desired (as shown in FIG. 16).

FIG. 13 is a graph comparing temperature variations over time for water heated by the heater element of FIG. 12A under different water conditions.

FIG. 13 details temperature curves for normal operation of the portable beverage preparation device in accordance with the principles of the invention. These temperature curves correspond to input parameters for the controller 130 of the power unit 164, through a series of heating slopes. These slopes are representative of behavior that will cause the controller 130 to shut off power to the switch 168, or begin a new cycle, when certain heating slopes occur. The changes in temperature are detected by the heater rod 166, based on resistance or conductivity changes, performed by the controller 130.

Line 122 labeled R is indicative of conditions in the chamber 172, when empty of liquid and the heater rod 166 in heater element 184 remains on. R indicates the detected linear rise in temperature, at a steep slope, that if this or a similar steep slope is attained at the start of a heating cycle, indicates that liquid is not in the cup unit 176, and the heating unit 162 will shut off. This occurs as the controller 130 shuts off power to the switch 168 and accordingly, the heater rod 166. Here, the process stops until the user replaces the empty cup unit 176 with a new one.

In line S by comparison, the inner segment 131 is at a gradual slope, indicating heating of liquid, typically water, to boiling temperatures, for example, approximately 105 degrees Celsius. Prior to boiling under pressure, latent heat that has accumulated, defines the outer segment 132, that is flat and/or of a very low slope at the end of the line 132. Here, all of the liquid has been passed out of the chamber 172 through the tube 196 and the temperature jumps dramatically as all the water is dissipated outward represented by segment 133 of line S. Note the steep rise of the slope similar to that for line R. This behavior results in the heating process being shut off and the beginning of a new cycle.

In the case of a heating process lasting too long in accordance with segment 132 (the temperature and pressure will rise greater than desired), this is indicative of a blocked valve, blocked tube or other outlet being blocked. The system will shut down indicating the need for repair. The controller 130 detects a change in conductivity/resistance, and shuts off power to the switch 168. The controller 130 has circuitry, typically configured to lock the electronics of the heating unit 162 for safety reasons, should shut off under these conditions occur. Also, the additional sensor 194 has circuitry that if activated will also signal the controller 130 to lock the system, if the aforementioned shut-off conditions occur.

The portable beverage preparation system of the invention, in alternative embodiments thereof, can also include sensors to indicate the presence or absence of a cup unit 176. There may also be sensors to indicate the presence of a new cup, in which case, the system will operate; or a used cup, an improper or a defective cup; in which case the system will not operate. These cup type sensors are typically optical sensors that detect color or equivalents as is known to those skilled in the art. The aforementioned sensors can be connected to the controller 130 that would either allow system operation or lock it, based on the detected condition.

Additionally, the system may include a locking plunger (not shown), that holds the cup unit 176 firmly in place on the heating unit 162 during operation and in particular during heating of the liquid.

FIG. 14 is a cross-sectional view of the cup unit from FIG. 11, including a brewing element. Similar elements and features are indicated by like designations of numerals.

FIG. 15 is an isometric, exploded, cross-sectional view of the cup unit of FIG. 14, but with a removable brewing element;

FIG. 15 details an alternate embodiment of the beverage preparation device with a cup unit 176, as detailed above, except that the brewing element 203 is separable from the cup body 205. This brewing element 203 includes a cuff 220 of a diameter just slightly greater than the diameter of the inner wall 222 of the upper, wider portion of the cup body 205, to provide a frictional engagement when the cuff 220 is placed into the inner cup 78. This brewing element 203 may be filled with a prepackaged consolidated beverage base, ground or powdered substance.

FIG. 16 is an isometric, cross-sectional view of a cover mounted on the cup unit of FIG. 14 after heating of a brew.

Referring now to FIG. 16, there is shown a cover 56, configured to fit the cup unit 176, to seal both the liquid and the powder isolated from each other and the ambient environment (typically to avoid contamination and moisture from the ambient environment after use). The cup unit 176 is normally supplied as a fully-equipped closed unit that contains treated (pretreated) water, powders or liquids.

The cover 56 includes lip segments 181 that connect with correspondingly configured lip segments 180 on the outer cup 182 in a snap-type connection. The cover 56 can be provided with protrusions 224 positioned and configured for fitting into the bores 51 of the brewing element 203. A central insert 226 covers the central opening 218 (indicated by central dashed line) to isolate liquids in the chamber 169 from the powders in the pocket 173.

Figure 17:
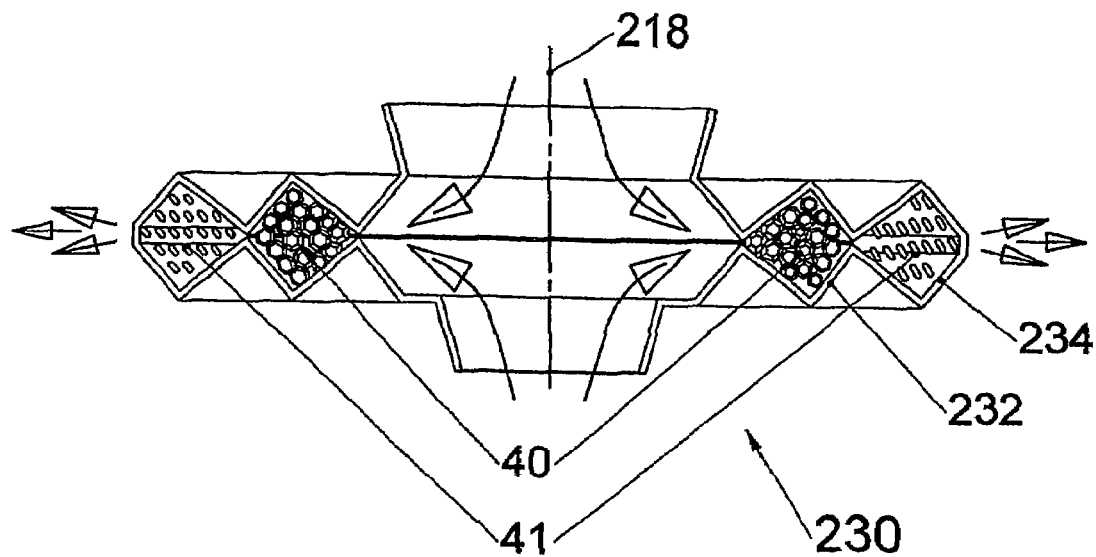
FIG. 17A is an axial, cross-sectional view of a further embodiment of a brewing element of the invention.
FIG. 17B is an isometric, cross-sectional view of the brewing element of FIG. 17A.
Figure 17:
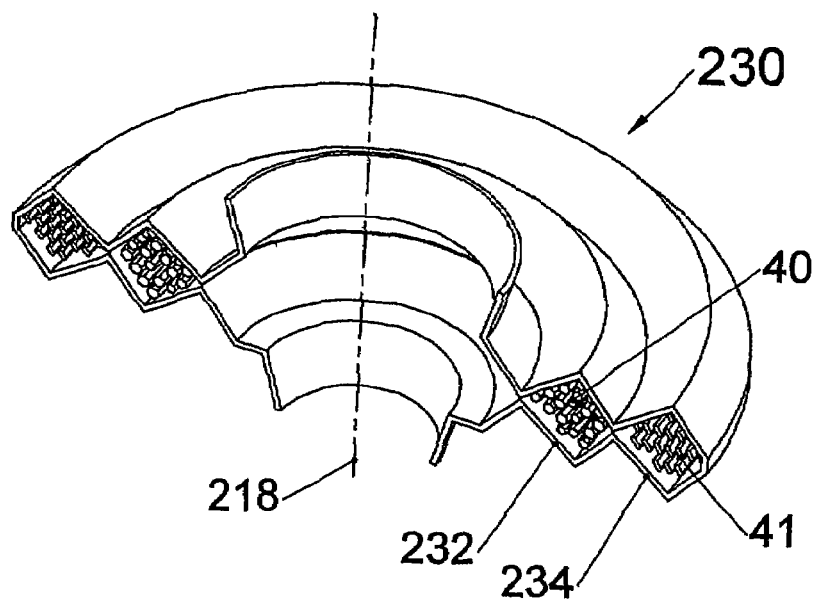

FIG. 17A is an axial, cross-sectional view of a further embodiment of a brewing element of the invention.

FIG. 17B is an isometric, cross-sectional view of the brewing element of FIG. 17A.

FIGS. 17A and 17B illustrate another embodiment of a brewing element 230 configured with two concentric ring sections 232, 234 for insertion of beverage preparation 40, 41, that is, different beverage preparations in each. These sections 232, 234 are sealed from each other and are opened by either heat or pressure or combinations thereof. Upon opening, the sections 232, 234 will form tunnels in a labyrinth configuration, allowing hot water to contact the beverage preparations in both sections 232, 234, prior to entering the outer cup 182 (FIG. 16). For example, combinations such as coffee and chocolate may be in each of the sections 232, 234, to provide a mocha beverage. Similarly, parallel radial chambers can be used for holding different beverage powders. The central core 218 is similar to that described heretofore for insertion of a portable heating unit 162.

Figure 18:
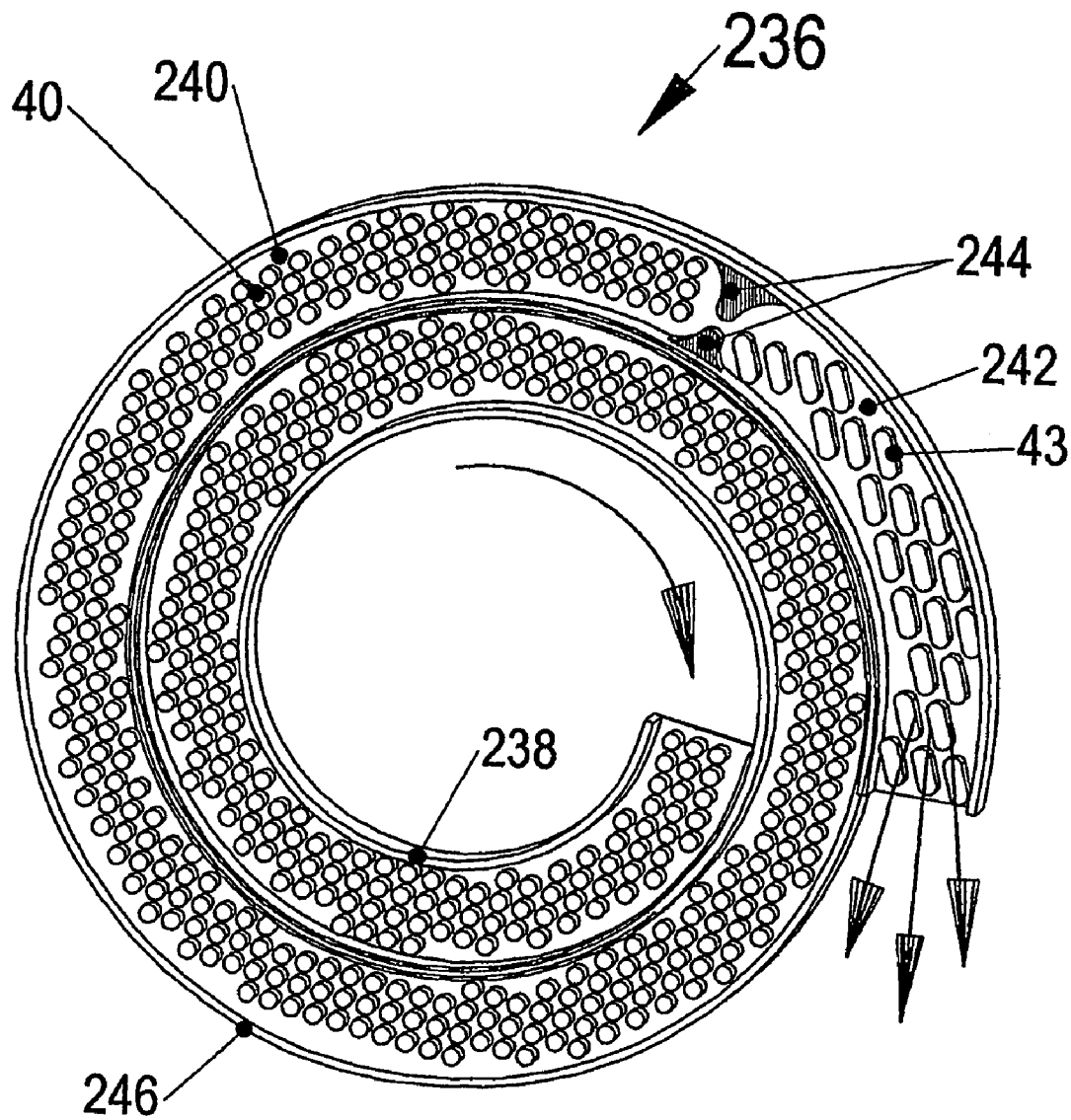
FIG. 18 is a top, cross-sectional view of another embodiment of a brewing element of the invention.

FIG. 18 is a top, cross-sectional view of yet another embodiment of a brewing element of the invention.

In FIG. 18, there is shown a brewing element 236 provided with a spiral channel 238 with two areas 240, 242, typically arranged serially, for different beverage preparations. There are typically partition members 244 between the two areas 240, 242. For example, the inner area 240 may hold one beverage preparation additive ingredient 40, such as coffee, and the outer area 242 may hold a different additive ingredient 43, such as chocolate, sugar, powdered milk, and the like.

In operation, hot water runs the course of the spiral channel 246, contacting both preparations, with sufficient pressure because of the narrowness of the channel 246, prior to entering the outer cup 78 (FIG. 16) as a mocha beverage. Arrows indicate the inlet and outlet for the water flow.

Alternatively, partition members 244 may be omitted and just a single additive ingredient, for example, soup powder, provided for mixing with the liquid in a cup unit 176, as hereinbefore described.

Figure 19:
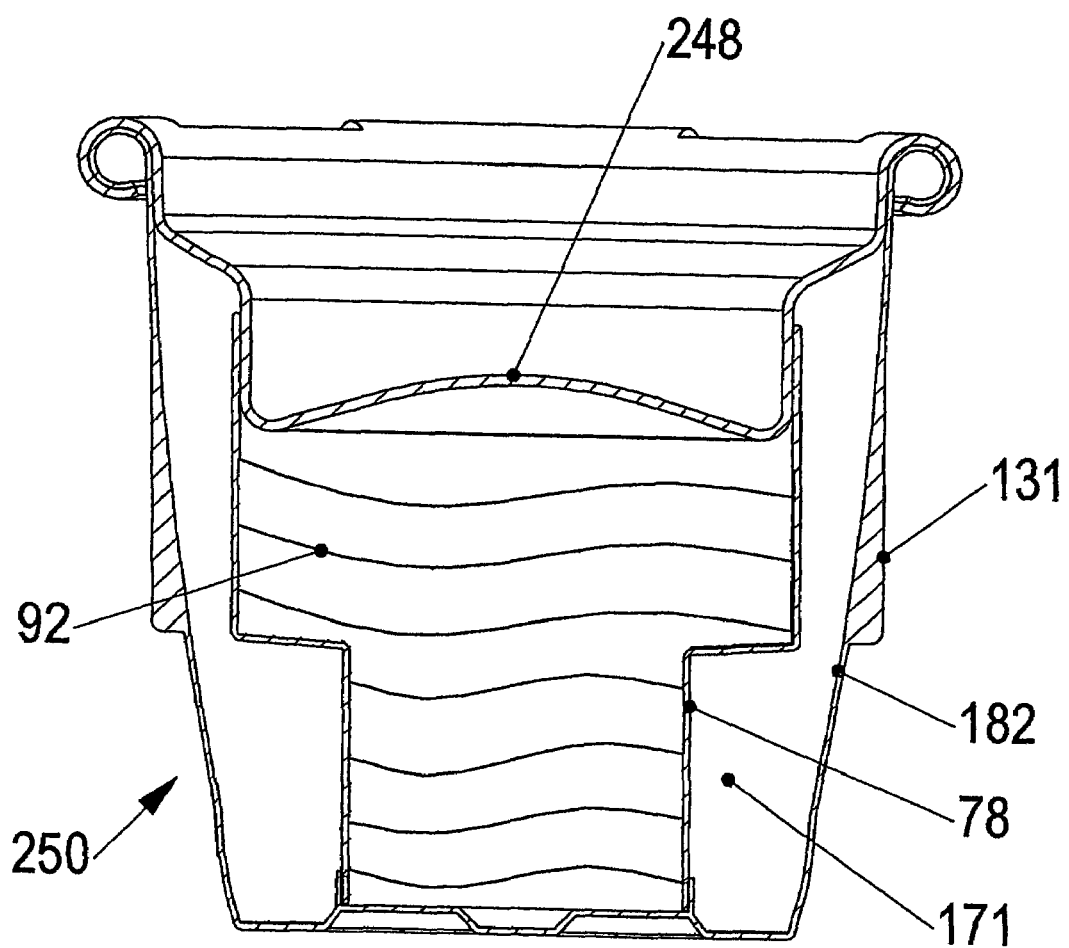
FIG. 19 is a cross-sectional view of another embodiment of a cup unit with a cover as in FIG. 15.

FIG. 19 is a cross-sectional view of another embodiment of the cup unit of FIG. 14.

In this alternate embodiment of the invention, the cup unit 250 is designed to accept a user-selected brewing element to be inserted into cup 250 (see FIG. 15) and heated by a heating unit. (such as 162 in FIG. 11). In this case, the inner cup 78 which contains treated water or other treated liquid 92 is sealed, typically with a peel-off lid 248 or the like, across the top of the inner cup 78, and also typically the outer cup 182. This peel-off lid 248 is easily opened by the user when a user desires to insert a brewing element, and is fabricated of materials to preserve the freshness of the liquid in the inner cup 78. The peel-off lid 248 can be such that it is a single lid, covering the entire cup unit 250 or multiple lids, covering various portions of the cup unit 250. Other features and elements of cup unit 250 are substantially as described hereinbefore.

While preferred embodiments of the present invention have been described, so as to enable one of skill in the art to practice the present invention, the preceding description is intended to be exemplary only, including the structural elements, combinations thereof, methods and processes, and portions thereof, disclosed herein. These descriptions should not be used to limit the scope of the invention. The scope of the invention should be determined by reference to the following claims.

The invention claimed is:

1. A portable beverage preparation device comprising:
 a portable drink container provided with a potable base liquid and at least one sealed compartment containing a beverage preparation kept isolated from said potable base liquid by a seal comprising at least two welded rings sufficiently spaced apart to prevent said potable base liquid from penetrating said sealed compartment; and a heating/cooling unit controlled by a controller, said heating/cooling unit comprising:
a heating/cooling element for heating/cooling said potable base liquid,
wherein said potable base liquid is made to flow on the same surface of said heating/cooling element for either of heating and cooling when operating said heating/cooling element on the Peltier principle, and
at least one pump unit configured for drawing said potable base liquid from said portable drink container into said heating/cooling unit and returning said potable base liquid thereto after heating/cooling,
such that when said heating/cooling unit is removably attached to said portable drink container and operated, said potable base liquid is drawn into said heating/cooling unit by said at least one pump unit and heated/cooled to a predetermined temperature by said heating/cooling element and returned under pressure back into said portable drink container through penetration of said seal, to mix with said beverage preparation within said sealed compartment, thereby dispensing said mixed brew directly into said portable drink container to provide a ready to drink brew.

2. The portable beverage preparation device of claim 1, wherein said drink container comprises a cup.

3. The portable beverage preparation device of claim 2, wherein said cup is provided with a sealed cover welded thereon by an attachment means forming a sealed cup unit containing said potable base liquid and said at least one sealed beverage preparation compartment needed to prepare a selected beverage drink.

4. The portable beverage preparation device of claim 3, wherein said sealed cover is configured with at least two utility openings covered with removable small covers comprising:
at least a first opening for extracting said beverage drink from said cup unit; and
at least a second opening for processing said beverage drink.

5. The portable beverage preparation device of claim 4, wherein said first opening provides for venting of said potable base liquid and for drinking therefrom.

6. The portable beverage preparation device of claim 4, wherein said removable small covers are applied to said utility openings to seal any waste materials inside said cup after use.

7. The portable beverage preparation device of claim 3, wherein said cup unit includes an inner cup nested in an outer cup, said inner cup spaced apart from said outer cup so as to define a chamber for holding liquid therebetween, and
wherein said outer cup is in communication with said chamber of said brewing element for receiving said potable base liquid that has passed therethrough.

8. The portable beverage preparation device of claim 3, wherein said cup unit is provided with a predetermined volume of said potable base liquid and includes an inner lid and an outer cover, wherein both said inner lid and said outer cover are removable for insertion of a user-selected beverage preparation element.

9. The portable beverage preparation device of claim 1, wherein said at least one beverage preparation element comprises at least one sealed compartment containing at least one beverage preparation selected from the group of edible materials including: coffee, tea, cocoa; dried fruits, dried vegetables; fruit juice, vegetable juice; milk and milk-substitute powders; syrups, sweeteners, flavorings; emulsions, solutions, extracts; dried herbs, medicines; liquid concentrates, liquid condensates, and any combination selected from said group of edible materials.

10. The portable beverage preparation device of claim 9, wherein said edible materials are in the form of dried, soluble edible substances.

11. The portable beverage preparation device of claim 9, wherein said at least one beverage preparation is dispersed in said potable base liquid by a dispenser means.

12. The portable beverage preparation device of claim 11, wherein said dispenser means comprises a hydraulic pump having a fixed arm and a moveable arm disposed within said drink container and said potable base liquid for effecting dispersion of said at least one beverage preparation confined within said at least one sealed compartment when pressure is applied by a user to the pressure point extremes of said fixed and moveable arms.

13. The portable beverage preparation device of claim 11, wherein said dispenser means comprises water pressure.

14. A portable beverage preparation device comprising:
a drink container comprising:
a sealed cover attached thereto configured with at least two utility openings fitted with removable covers;
a predetermined volume of potable base liquid;
at least one sealed compartment provided with at least one bore for confining a beverage preparation,
wherein said potable base liquid and said at least one sealed compartment are in close proximity within said drink container and covered by said sealed cover;
a heating/cooling unit for heating/cooling said potable base liquid, said heating/cooling unit including a heating/cooling element;
at least one pump unit for pumping and circulating said potable base liquid; and
a controller and a power source for controlling and activating said at least one pump unit,
wherein said heating/cooling unit, said at least one pump unit, and said controller are disposed in a portable housing comprising a heating/cooling chamber, and
wherein when said at least one pump unit is connected to a power source and operated, said potable base liquid is circulated so as to be heated/cooled by said heating/cooling unit and mixed with said beverage preparation to provide a heated/cooled beverage in said drink container.

15. The portable beverage preparation device of claim 14 further comprising:
a portable heating device configured to be attached to said drink container for providing heating of a beverage drink on demand.

16. The portable beverage preparation device of claim 15, wherein said portable heating device comprises a heating element, including heating coils, configured for direct insertion into said potable base liquid.

17. The portable beverage preparation device of claim 15, wherein said portable heating device comprises a solid-state heat pump that utilizes the Peltier effect for either of heating and cooling said beverage drink.

18. The portable beverage preparation device of claim 15, wherein said heating device further includes:
a holding chamber for accommodating at least a portion of said potable base liquid;
at least one heat-activated valve for controlling the flow of said potable base liquid through said heating element;
a heater rod extending into said holding chamber; and a tube in communication with said holding chamber and said beverage preparation element, wherein said heater element, when fitted within said holding chamber and activated, operates said heater rod to heat said at least a portion of said potable base liquid to at least boiling within said holding chamber, and wherein said holding chamber retains said potable base liquid by activation of said at least one heat-activated valve to produce pressure in said holding chamber for pushing said heated potable base liquid through said tube.

19. The portable beverage preparation device of claim 18, wherein said heat-activated valve includes a bimetal strip.

20. A portable beverage preparation system comprising:
a cup unit including an inner cup formed integrally with an outer cup, said inner cup spaced apart from said outer cup so as to define a chamber for holding a potable base liquid therebetween;
a heating/cooling unit comprising:
  a heating/cooling element for heating/cooling said potable base liquid; and
  a brewing element configured with at least one pocket for holding at least one beverage preparation for fitting on said inner cup, for the passage of said potable base liquid therethrough, and including an outlet proximate to the periphery of said outer cup, and
at least one pump unit configured for drawing said potable base liquid from said portable drink container into said heating/cooling unit and returning said potable base liquid thereto after heating/cooling,
wherein said potable base liquid is made to flow on the same surface of said heating/cooling element for either of heating and cooling when operating said heating/cooling element on the Peltier principle,
such that when said heating/cooling unit is removably attached to said portable drink container and operated, said potable base liquid is drawn into said heating/cooling unit by said at least one pump unit and heated/cooled to a predetermined temperature by said heating/cooling element and returned under pressure back into said portable drink container, mixed with said beverage preparation, and dispensed within said cup unit to provide a ready to drink brew.

21. The beverage preparation system of claim 20, wherein said outer cup is provided with external isolation ribs for dissipating heat when said outer cup is filled with a hot liquid.

22. The beverage preparation system of claim 20, wherein said at least one beverage preparation is espresso.

23. The beverage preparation system of claim 20, wherein said brewing element is provided with a centrally disposed bore oriented axially within said brewing element.

24. The beverage preparation system of claim 20, wherein said brewing element is provided with a bore axially offset with respect to the central axis of said brewing element.

25. The beverage preparation system of claim 20, wherein said brewing element further comprises at least two concentric rings, for storage of at least two types of beverage preparations.

26. The beverage preparation system of claim 20, wherein said brewing element has a spiral configuration, said liquid entering said spiral at an inner edge thereof and exiting at an outer edge thereof, said outer edge communicating with said second cup.

27. The beverage preparation system of claim 26, wherein said spiral configuration has at least two beverage preparation areas arranged sequentially in the spiral, such that said potable base liquid enters said spiral at said inner edge and passes through said first beverage preparation area and continues to pass through said spiral through a second beverage preparation area and exits through said outer edge communicating with said second cup.

28. The portable beverage preparation system of claim 20, wherein said heating/cooling unit further comprises:
a holding chamber for accommodating at least a portion of said potable base liquid;
at least one heat-activated valve for sealing said holding chamber to confine said portion in said holding chamber;
a heater rod extending into said holding chamber; and
a tube in communication with said holding chamber and said beverage preparation,
wherein said heating/cooling unit, when activated, operates said heater rod to heat said at least a portion of said potable liquid to at least boiling temperature within said holding chamber,
such that said holding chamber retains said potable base liquid by activation of said at least one heat-activated valve to produce pressure in said holding chamber for pushing said heated potable base liquid through said tube and into said beverage preparation.

29. The beverage preparation system of claim 28, wherein said at least one heat-activated valve includes a vent for providing venting from said holding chamber.

30. A method for preparing a beverage drink comprising:
providing a portable drink container with a potable base liquid and at least one sealed compartment containing a beverage preparation kept isolated from said potable base liquid by a seal comprising at least two welded rings sufficiently spaced apart to prevent said potable base liquid from penetrating said sealed compartment;
drawing said potable base liquid from said portable drink container into said heating/cooling unit and returning said potable base liquid thereto after heating/cooling said potable base liquid; and
flushing said at least one beverage preparation from said at least one sealed compartment into said potable base liquid by one of pressure action and sprinkler means,
thereby penetrating said seal, to mix said beverage preparation with said potable base liquid.

31. The method of claim 30 wherein said potable base liquid is treated water.

32. A method for preparing a brewed beverage drink comprising:
a) providing a portable drink container with a potable base liquid;
b) providing a brewing element, including at least one sealed compartment containing a beverage preparation kept isolated from said potable base liquid by a seal comprising at least two welded rings sufficiently spaced apart to prevent said potable base liquid from penetrating said sealed compartment;
c) drawing said potable base liquid from said portable drink container and continuously heating predetermined quantities of said potable base liquid to a predetermined temperature, and returning said potable base liquid thereto; and
d) pressurizing said heated liquid to force it into and out of said beverage preparation confined within said at least one sealed compartment,
thereby penetrating said seal, to mix said beverage preparation with said potable base liquid.

33. The method of claim 32, additionally comprising:
e) repeating steps b, c, and d.

* * * * *